US007676097B2

(12) United States Patent
Sakai

(10) Patent No.: US 7,676,097 B2
(45) Date of Patent: Mar. 9, 2010

(54) BIT SHIFT PROCESSING IN WAVELET-BASED IMAGE CODECS

(75) Inventor: Hiroaki Sakai, Chino (JP)

(73) Assignee: Seiko Epson Corporation (JP)

(*) Notice: Subject to any disclaimer, the term of this patent is extended or adjusted under 35 U.S.C. 154(b) by 993 days.

(21) Appl. No.: 11/201,755

(22) Filed: Aug. 11, 2005

(65) Prior Publication Data

US 2006/0034525 A1   Feb. 16, 2006

(30) Foreign Application Priority Data

Aug. 12, 2004 (JP) ............... 2004-235227
Jun. 28, 2005 (JP) ............... 2005-188389

(51) Int. Cl.
G06K 9/36 (2006.01)
G06K 9/46 (2006.01)

(52) U.S. Cl. .................. 382/232; 382/239; 382/240

(58) Field of Classification Search ............ 382/232, 382/239, 240
See application file for complete search history.

(56) References Cited

U.S. PATENT DOCUMENTS

| 5,162,898 A | 11/1992 | Aono | |
|---|---|---|---|
| 6,665,444 B1* | 12/2003 | Kajiwara | 382/240 |
| 6,766,044 B1* | 7/2004 | Tsujii | 382/132 |
| 6,853,466 B1* | 2/2005 | Harada et al. | 358/1.9 |
| 7,227,998 B2 | 6/2007 | Nakayama et al. | |
| 2001/0016077 A1* | 8/2001 | Oki | 382/240 |
| 2001/0048770 A1* | 12/2001 | Maeda | 382/243 |
| 2002/0003905 A1* | 1/2002 | Sato et al. | 382/240 |
| 2002/0005909 A1* | 1/2002 | Sato | 348/559 |
| 2003/0002734 A1* | 1/2003 | Islam et al. | 382/166 |
| 2003/0138156 A1* | 7/2003 | Schwartz | 382/240 |
| 2003/0228060 A1 | 12/2003 | Kashina | |
| 2004/0006582 A1 | 1/2004 | Hagihara | |
| 2004/0179609 A1* | 9/2004 | Takahashi et al. | 375/240.25 |
| 2005/0141773 A1* | 6/2005 | Mizuno | 382/239 |

FOREIGN PATENT DOCUMENTS

| JP | 2003-152984 | 5/2003 |
|---|---|---|
| JP | 2004-015741 | 1/2004 |
| JP | 2004-032772 | 1/2004 |
| JP | 2004-040429 | 2/2004 |
| JP | 2004-215093 | 7/2004 |

* cited by examiner

Primary Examiner—Samir A. Ahmed
Assistant Examiner—Li Liu
(74) Attorney, Agent, or Firm—Harness, Dickey & Pierce, P.L.C.

(57) ABSTRACT

A digital image encoding device, which encodes digital image data using a discrete wavelet transform, includes a coefficient bit shift processing unit that performs bit shift processing on a wavelet coefficient after the discrete wavelet transform. The coefficient bit shift processing shifts the wavelet coefficient to a lower bit side by a predetermined number of bits to truncate a lower bit, and reduces the number of effective bits to create a new wavelet coefficient.

11 Claims, 14 Drawing Sheets

ONE-BIT SHIFT

TWO-BIT SHIFT

THREE-BIT SHIFT

BIT SHIFT PROCESSING IN WAVELET-BASED IMAGE CODECS

BACKGROUND OF THE INVENTION

1. Technical Field

The present invention relates to a digital image encoding device which uses JPEG2000 as an international standard compression scheme of color still images or the like, to a digital image encoding program, to a digital image encoding method, to a digital image decoding device, to a digital image decoding program, and to a digital image decoding method.

2. Related Art

Currently, 'JPEG (Joint Photographic Expert Group)', which is used as an image compression format standard of color still images or the like of a digital camera is an international standard compression scheme in which a discrete cosine transform (DCT) is primarily used in combination with run length encoding or Huffman encoding. However, with 'JPEG', when the compression ratio is increased, there is a problem in that block-shaped encoding strain appears. Further, since 'JPEG' is an irreversible compression scheme, if compressed, the same image as an original image cannot be obtained.

On the contrary, a new image compression scheme 'JPEG2000' uses a discrete wavelet transform (DWT), instead of DCT, so that block strain does not occur even when the compression ratio increases. Further, since 'JPEG2000' is a reversible compression scheme, it is advantageous in that an original image can be perfectly expanded while keeping a high compression ratio. Therefore, JPEG2000 has become the most significant image format in various fields relating to digital images.

Although 'JPEG2000' has an excellent advantage, which cannot be obtained from 'JPEG', there is a problem in that the amount of information is enormous at the time of compression and expansion processes and thus the processing speed is low. Further, there is a problem in that a large memory is consumed when a processing is performed in hardware.

In order to solve the above-described problems, for example, in Japanese Unexamined Patent Application Publication No. 2004-15741, a method has been suggested in which only required bits are truncated before a bit plane so as to reduce time or power for bit plane processing. In addition, in Japanese Unexamined Patent Application Publication No. 2004-40429, a method has been suggested in which a lower bit plane substituting unit is provided next to a coefficient modeling processing unit, which performs coefficient modeling processing after the wavelet transform, so as to substitute all of the lower bit planes with '0' so as to reduce the amount to be processed, thereby increasing the processing speed and reducing the amount of memory consumption.

According to the method disclosed in Japanese Unexamined Patent Application Publication No. 2004-15741, the required bits are truncated so as to truncate unused bits, thereby reducing the time or power of the bit plane processing. However, this causes a problem in that high-speed processing cannot be achieved when unused bits do not exist. Further, when this method is applied to 'JPEG2000', high-speed processing cannot be achieved since 'JPEG2000' does not process unnecessary bits at the beginning.

Further, according to the method disclosed in Japanese Unexamined Patent Application Publication No. 2004-40429, all of the lower bit planes are substituted with '0' so as to reduce the amount to be processed, thereby increasing processing speed and reducing the amount of memory consumed. In this case, however, the process of substituting all of the lower bit planes with '0' is next to the coefficient bit modeling, and thus there are many cases in which the processing time is not markedly changed, depending on the kind of bit modeling, as compared with 'JPEG2000'.

SUMMARY

An advantage of the invention is that it provides a digital image encoding device, in which the processing time required for encoding can be markedly reduced in processing by JPEG2000, a digital image encoding program, and a digital image encoding method.

In addition, another advantage of the invention is that it provides a digital image decoding device, in which the processing time required for decoding can be markedly reduced in JPEG2000 processing, a digital image decoding program, and a digital image decoding method.

According to a first aspect of the invention, a digital image encoding device, which encodes digital image data using a discrete wavelet transform, includes a coefficient bit shift processing unit that performs a bit shift processing on a wavelet coefficient after the discrete wavelet transform. Here, the coefficient bit shift processing may shift the wavelet coefficient to a lower bit side by a predetermined number of bits to truncate a lower bit, and reduce the number of effective bits to create a new wavelet coefficient.

According to this configuration, the number of effective bits of the wavelet coefficient after the discrete wavelet transform is reduced, and thus the amount of data is markedly reduced. As a result, the load of a subsequent processing, such as coefficient bit modeling processing or arithmetic encoding processing, is markedly reduced so that it is possible to perform encoding (so called, JPEG2000 file) at a high speed. Further, when encoding is performed in hardware, it is possible to markedly reduce the amount of memory used.

In addition, JPEG2000 to be used in the above-described aspect will now be briefly described.

An encoding processing of digital image data in JPEG2000 is broadly divided into 1) a DC level shift processing, 2) a component transformation (color transformation) processing, 3) a tile division processing of an image component, 4) a discrete wavelet transform processing, 5) a quantization, 6) an EBCOT (Embedded Block Coding with Optimal Truncation), and 7) a layer generation processing.

1. DC Level Shift Processing

First, a DC level shift processing is a processing to remove a DC offset for an input signal having a DC offset therein. That is, it is assumed that a signal not having a DC offset is used as an input in the encoding processing, and thus the DC offset value should be removed from the input signal having a DC offset at the first time. For example, when an original image is a 24-bit bit map, there exist three components (R, G, and B). Here, since each component is expressed in an unsigned 8-bit integer in a range of 'from 0 to 255', when this integer is level-shifted to '−127 to 127' and the mean is set to, for example, '0', the DC offset value is removed. Therefore, the DC level shift processing is applied to a non-polar component sample, and, when a polar component sample exists from the beginning, the DC level shift processing is not required. In addition, as shown in FIG. 1 or the like, a position where the DC level shift processing is performed is ahead of the component transformation processing when a plurality of components exist, and is ahead of the discrete wavelet transform when a single component exists. In addition, the component transformation processing may not be performed when the plurality of components exist.

2. Component Transformation (Color Transformation)

Next, the component transformation is a processing to transform a signal input in a RGB color space into a YCbCr (or YUV) color space through a linear transformation in order to increase a compression ratio. With this transformation processing, the correlation among RGB signals can be reduced, and a color difference component can be more compressed than a luminance (Y) component with low detection sensitivity for strains of a color difference (CbCr) as human visual characteristics. Therefore, compression characteristics are enhanced. In addition, the component transformation has reversible and irreversible characteristics. The reversible component transformation (RCT) can be used in non-strain or strain encoding, but the irreversible component transformation (ICT) can be used only in strain encoding. In addition, when digital image data does not include a color component, like a monochrome image, this processing may be omitted.

3. Tile Division of Image Component

Each of component-transformed component images can be divided into tiles in a space region of a size not having an overlap portion or a size having a partial overlap portion. The tile division is performed at a relative position between the components. The tile components obtained by tile-dividing the component-transformed images are separately encoded, and thus serve as basis units in the encoding processing. In addition, it is possible to perform a division processing for an input signal before performing the DC level shift processing. In addition, the subsequent discrete wavelet transform can be performed for the entire image. In this case, the tile division procession may be omitted. In the embodiments described below, an example in which the tile division processing is omitted is described.

4. Discrete Wavelet transform

Next, the discrete wavelet transform divides frequency components of each tile component into a high frequency component and a low frequency component. Specifically, first, for example, a vertical component is divided into a low frequency component and a high frequency component (a horizontal component may be divided first). Next, for the generated low and high frequency components of the vertical component, the division of the horizontal component is performed. By doing so, four sub-band coefficients in total, that is, a low frequency having both vertical and horizontal components, a high frequency having a vertical component and a low frequency having a horizontal component, a low frequency having a vertical component and a high frequency having a horizontal component, and a high frequency having both vertical and horizontal components, are generated. In addition, the discrete wavelet transform may be performed repeatedly on the low frequency component (the discrete wavelet transform may also be performed repeatedly on the high frequency component). In addition, the discrete wavelet transform uses the distribution of the frequency components in the same manner as the DCT transformation, but is markedly different from the DCT transformation in that a processing to transform resolution in a spatial range is repeatedly performed, such that various kinds of spatial resolution images can be easily generated (resolution scalability). In addition, with respect to compression characteristics, the reason for using the discrete wavelet transform in JPEG2000 is that the discrete wavelet transform is excellent over the DCT transformation at a low bit rate, in particular. In addition, a wavelet transform filter used for the transformation processing includes two filters of a real number-type 9/7 irreversible filter and an integer-type 5/3 reversible filter. Here, the former has a good encoding characteristic but is applicable only to irreversible compression.

5. Quantization

Quantization is a processing to further reduce the precision of the sub-band coefficient generated in the discrete wavelet transform, which can be changed for each sub-band coefficient. In addition, when reversible encoding is performed using the integer-type wavelet transform filter, this processing is not performed. In the embodiments described below, an example in which this processing is omitted is described.

6. EBCOT

An EBCOT (Embedded Block Coding with Optimal Truncation) includes two steps of coefficient bit modeling and arithmetic encoding, which is entropy encoding. Coefficient bit modeling is a bit plane processing to perform grouping in order to enhance encoding efficiency. Specifically, the wavelet transform coefficient (sub-band coefficient) is a multi-value signal, while the input signal of the arithmetic encoding is a binary signal of either '0' or '1'. In this regard, the coefficient bit modeling serves to change the multi-value wavelet transform coefficient into a two-value signal so as to efficiently encode with the arithmetic encoding. This processing includes the steps of dividing the wavelet transform coefficient into code blocks in fixed sizes, expanding the respective transformation coefficients into bit planes, and performing arithmetic encoding based on an encoding pass on the respective bit planes.

7. Layer Generation

Layer generation performs layering on compressed data generated by arithmetic encoding of the EBCOT according to a degree of contribution to image quality.

In addition, according to a second aspect of the invention, a digital image encoding device, which encodes encoding digital image data using a discrete wavelet transform, includes a coefficient bit shift processing unit that performs a bit shift processing for a wavelet coefficient after the discrete wavelet transform. Here, the coefficient bit shift processing may shift the wavelet coefficient to a lower bit side by a predetermined number of bits, and reduce the number of effective bits to create a wavelet coefficient different from the wavelet coefficient.

According to this configuration, like the first aspect of the invention, the number of effective bits of the wavelet coefficient after the discrete wavelet transform is reduced, and thus the amount of data to be processed in the subsequent processing, such as coefficient bit modeling processing or arithmetic encoding processing, is markedly reduced. Thus, it is possible to perform encoding at a high speed and also to markedly reduce the amount of memory used when encoding is performed in hardware.

In addition, according to a third aspect of the invention, a digital image encoding device includes a discrete wavelet transform unit that divides digital image data into a high frequency component and a low frequency component to transform image data for each sub-band into a discrete wavelet coefficient, a coefficient bit shift processing unit that performs a bit shift processing on the wavelet coefficient after being transformed by the discrete wavelet transform unit, an embedded block coding with optimal truncation (EBCOT) that performs a coefficient modeling processing and an arithmetic encoding processing on the wavelet coefficient bit-shifted by the coefficient bit shift processing unit to generate compressed data, and a layer generating unit that performs layering on the compressed data generated by the EBCOT.

Here, the coefficient bit shift processing unit may shift the wavelet coefficient into a lower bit side by a predetermined number of bits, and reduce the number of effective bits to create a wavelet coefficient different from the wavelet coefficient.

According to this configuration, like the first aspect of the invention, the number of effective bits of the wavelet coefficient after the discrete wavelet transform by the discrete wavelet transform unit is reduced, and thus the amount of data to be processed in the subsequent processing, such as coefficient bit modeling processing or arithmetic encoding processing, is markedly reduced. Thus, it is possible to perform encoding at a high speed and also to markedly reduce the amount of memory used when encoding is performed in hardware.

In addition, according to a fourth aspect of the invention, in the digital image encoding device according to any one of the first to third aspects of the invention, the coefficient bit shift processing unit may perform the bit shift processing for sub-band coefficients including a high frequency component among sub-band components constituting the wavelet coefficient.

According to this configuration, like the first aspect of the invention, encoding can be performed at a high speed, while suppressing image degradation caused by the bit shift processing to the minimum. Specifically, since the human eye is insensitive to the high frequency component of the image but sensitive to the low frequency component, the bit shift processing is performed on the sub-band coefficients including the high frequency component rather than on the sub-band coefficients including the low frequency component, thereby effectively suppressing image degradation.

In addition, according to a fifth aspect of the invention, in the digital image encoding device according to any one of the first to third aspects of the invention, the coefficient bit shift processing unit may calculate degrees of contribution of image quality for the respective sub-band coefficients constituting the wavelet coefficient, and perform different bit shift processings for the respective sub-band coefficients based on the degrees of contribution.

According to this configuration, like the first aspect of the invention, encoding can be performed at a high speed, and, like the second aspect of the invention, the image degradation caused by the bit shift processing can be suppressed to the minimum. Specifically, as described above, since the human eye is insensitive to the high frequency component of the image but sensitive to the low frequency component, the bit shift processing is performed on the sub-band coefficients including the high frequency component rather than on the sub-band coefficients including the low frequency component. Further, since the degrees of contribution to image quality are different among the sub-band coefficients including the high frequency component, in particular, the number of bit shift from the sub-band coefficients having a small degree of contribution to image quality is increased and the number of bit shift from the sub-band coefficients having a large degree of contribution to image quality is reduced, thereby effectively suppressing image degradation. In addition, similarly, since the human eyen is insensitive to an image color difference component but sensitive to a luminance component, the number of bit shift from the sub-band coefficients corresponding to the color difference component is increased, and the bit shift processing is not performed or the number of bit shift is reduced from the sub-band coefficients corresponding to the luminance component.

In addition, according to a sixth aspect of the invention, a digital image encoding device, which encodes digital image data using a discrete wavelet transform, includes a pre-transformation bit shift processing unit that performs a bit shift processing on the digital image data before the discrete wavelet transform. Here, the bit shift processing may shift the digital image data to a lower bit side by a predetermined number of bits, and reduce the number of effective bits to create digital image data different from the digital image data.

According to this configuration, like the first aspect of the invention, encoding can be performed at a high speed, and the amount of memory used can be reduced. Specifically, in the discrete wavelet transform, the number of bits after the transformation is typically larger than the number of bits before the transformation. For this reason, the bit shift processing is performed before the discrete wavelet transform, and thus it is possible to efficiently reduce the coefficient after the discrete wavelet transform, and to implement high-speed encoding. In addition, it is possible to reduce the amount of memory used when encoding is performed in hardware.

In addition, according to a seventh aspect of the invention, a digital image encoding device, which encodes digital image data using a discrete wavelet transform, includes a pre-transformation bit shift processing unit that performs a bit shift processing on the digital image data before the discrete wavelet transform. Here, the bit shift processing may shift the digital image data to a lower bit side by a predetermined number of bits, and reduce the number of effective bits to create digital image data different from the digital image data.

According to this configuration, like the first aspect of the invention, it is possible to implement high-speed encoding and also to reduce the amount of memory used.

In addition, according to an eighth aspect of the invention, a digital image encoding device includes a bit shift processing unit that bit-shifts digital image data, a discrete wavelet transform unit that divides digital image data bit-shifted by the bit shift processing unit into a high frequency component and a low frequency component to transform image data for each sub-band into a discrete wavelet coefficient, an embedded block coding with optimal truncation (EBCOT) that performs a coefficient modeling processing and an arithmetic encoding processing on the wavelet coefficient transformed by the discrete wavelet transform unit to generate compressed data, and a layer generating unit that performs layering on the compressed data generated by the EBCOT. Here, the bit shift processing unit may shift the digital image data to a lower bit side by a predetermined number of bits, and reduce the number of effective bits to create digital image data different from the digital image data.

According to this configuration, like the first aspect of the invention, it is possible to implement high-speed encoding and also to reduce the amount of memory used.

In addition, according to a ninth aspect of the invention, a digital image encoding device, which encodes digital image data using a discrete wavelet transform, includes a coefficient bit shift processing unit a coefficient bit shift processing unit that performs a bit shift processing on a wavelet coefficient after the discrete wavelet transform, and a pre-transformation bit shift processing unit that performs a bit shift processing on the digital image data before the discrete wavelet transform.

According to this configuration, the bit shift processings are performed before and after the discrete wavelet transform processing, and thus the number of effective bits is reduced. Therefore, like the first aspect of the invention, it is possible to implement high-speed encoding and also to reduce the amount of memory used.

In addition, according to a tenth aspect of the invention, the digital image encoding device according to any one of the first and ninth aspects of the invention may further include a component transformation unit that transforms the digital image data into a color space depending on human visual characteristics before the discrete wavelet transform.

According to this configuration, the component transformation processing of the digital image data can be performed before the discrete wavelet transform, so that, in the subsequent bit shift processing, it is possible to concentrate the bit shift processing on the components whose degradation is difficult to perceive with the human eye, as described above. Therefore, it is possible to implement more appropriate encoding.

In addition, according to an eleventh aspect of the invention, in the digital image encoding device according to the tenth aspect of the invention, the component transformation unit may perform a color transformation processing that transforms the digital image data into a luminance component and a color difference component.

According to this configuration, information included in an image is concentrated on the luminance component, so that it is possible to perform a bit shift processing for the color difference component insensitive to the human eye. Therefore, it is possible to implement more appropriate encoding.

In addition, according to a twelfth aspect of the invention, there is provided a digital image decoding device which decodes encoded data encoded by the digital image encoding device according to the first aspect of the invention into digital image data close to original digital image data using a discrete wavelet reverse transformation. The digital image decoding device includes a reverse coefficient bit shift processing unit that performs a reverse bit shift processing on a wavelet coefficient before the discrete wavelet reverse transformation. Here, the reverse bit shift processing may shift the wavelet coefficient to an upper bit side by the predetermined number of bits, and increase the number of effective bits to create a wavelet coefficient different from the wavelet coefficient.

According to this configuration, encoded data (a JPEG2000 file) encoded by the digital image encoding device according to the first aspect of the invention can be decoded. Therefore, an image, which is not visually perceived as or extremely close to original digital image data (original image: BMP file), or a high-quality image corresponding to reproduction image quality (compression ratio, or the like) can be provided.

In addition, according to a thirteenth aspect of the invention, in the digital image decoding device according to the twelfth aspect of the invention, when the bit shift processing at the time of encoding is performed on some sub-band coefficients among sub-band coefficients constituting the wavelet coefficient, the reverse coefficient bit shift processing unit may perform the reverse bit shift processing only on the sub-band coefficients on which the bit shift processing is performed.

According to this configuration, data close to digital image data before encoding can be decoded, and thus an image close to an original image can be reproduced.

In addition, according to a fourteenth aspect of the invention, in the digital image decoding device according to the twelfth aspect of the invention, when different bit shift processings are performed on the respective sub-band coefficients constituting the wavelet coefficient, the reverse coefficient bit shift processing unit may perform the reverse bit shift processing corresponding to the respective bit shift processings.

According to this configuration, like the thirteenth aspect of the invention, data close to digital image data before encoding can be decoded, and thus an image close to the original image can be reproduced.

In addition, according to a fifteenth aspect of the invention, there is provided a digital image decoding device which decodes encoded data encoded by the digital image encoding device according to the eight aspect of the invention into digital image data close to original digital image data using a discrete wavelet reverse transformation. The digital image decoding device includes a reverse bit shift processing unit that performs a reverse bit shift processing on the digital image data before the discrete wavelet reverse transformation. Here, the reverse bit shift processing may shift the digital image data to an upper bit side by the predetermined number of bits, and increase the number of effective bits to create digital image data different from the digital image data.

According to this configuration, encoded data encoded by the digital image encoding device according to the eighth aspect of the invention can be decoded. Therefore, an image, which is not visually perceived as or extremely close to original digital image data (original image: BMP file), or a high-quality image corresponding to reproduction image quality (compression ratio, or the like) can be provided.

In addition, according to a sixteenth aspect of the invention, there is provided a digital image decoding device which, using a discrete wavelet reverse transformation, decodes data encoded using a discrete wavelet transform. The digital image decoding device includes the reverse coefficient bit shift processing unit according to any one of the twelfth to fourteenth aspects of the invention, and the reverse bit shift processing unit according to the fifteenth aspect of the invention.

According to this configuration, since the reverse bit shift processings are performed before and after the discrete wavelet transform processing and thus the number of effective bits is increased through, an image close to the original image can be reproduced.

in addition, according to a seventeenth aspect of the invention, the digital image decoding device according to any one of the twelfth to fourteenth aspects of the invention may further include a component reverse transformation unit that transforms the digital image data from a color space depending on human visual characteristics to an image signal independent of the human visual characteristics, after the discrete wavelet reverse transformation.

According to this configuration, when the digital image data before encoding includes a plurality of components, such as RGB or the like, image data obtained by performing the reverse bit shift processings before or after the discrete wavelet transform processing can be decoded into digital image data having a plurality of original components.

In addition, according to an eighteenth aspect of the invention, in the digital image decoding device according to the seventeenth aspect of the invention, the component reverse transformation unit may perform a color transformation processing that transforms the digital image data from a luminance component and a color difference component to an image signal.

According to this configuration, when the digital image data before the bit shift processing has a luminance component and a color difference component, image data obtained by performing the reverse bit shift processings before or after the discrete wavelet transform processing can be decoded into digital image data having the original luminance and color difference components.

In addition, according to a nineteenth aspect of the invention, a digital image encoding method, which encodes digital image data using a discrete wavelet transform, includes shifting a wavelet coefficient after the discrete wavelet transform to a lower bit side by a predetermined number of bits, and reducing the number of effective bits to create a wavelet coefficient different from the wavelet coefficient.

According to this configuration, like the first aspect of the invention, the number of effective bits of the wavelet coefficient after the discrete wavelet transform is reduced, and thus the amount of data to be processed in the subsequent processing, such as coefficient bit modeling processing or arithmetic encoding processing, is markedly reduced. Therefore, since the load is markedly reduced, encoding can be performed at a high speed and also the amount of memory used can be markedly reduced when encoding is performed in hardware.

In addition, according to a twentieth aspect of the invention, a digital image encoding method, which encodes digital image data using a discrete wavelet transform, includes shifting a wavelet coefficient after the discrete wavelet transform to a lower bit side from a coefficient storing unit by a predetermined number of bits, and reducing the number of effective bits to create a wavelet coefficient different from the wavelet coefficient.

According to this configuration, like the first aspect of the invention, the load of processing, such as coefficient bit modeling processing or arithmetic encoding processing, is markedly reduced, encoding can be performed at a high speed and the amount of memory used can be markedly reduced when encoding is performed in hardware.

In addition, according to a twenty-first aspect of the invention, in the digital image encoding method according to the nineteenth or twentieth aspect of the invention, the bit shift processing may be performed on sub-band coefficients having a high frequency component among the sub-band coefficients constituting the wavelet coefficient.

According to this configuration, like the fourth aspect of the invention, high-speed encoding can be implemented and image degradation can be suppressed to the minimum.

In addition, according to a twenty-second aspect of the invention, the digital image encoding method according to the nineteenth or twentieth aspect of the invention may further include calculating degrees of contribution to image quality for the respective sub-band coefficients constituting the wavelet coefficients, and performing different bit shift processings for the respective sub-band coefficients depending on the degrees of contribution.

According to this configuration, like the fifth aspect of the invention, high-speed encoding can be implemented and image degradation caused by the bit shift processing can be suppressed to the minimum.

In addition, according to a twenty-third aspect of the invention, a digital image encoding method, which encodes digital image data using a discrete wavelet transform, includes shifting the digital image data before the discrete wavelet transform to a lower bit side by a predetermined number of bits, and reducing the number of effective bits to create digital image data different from the digital image data.

According to this configuration, like the sixth aspect of the invention, high-speed encoding can be implemented and also the amount of memory used can be reduced.

In addition, according to a twenty-fourth aspect of the invention, a digital image encoding method, which encodes digital image data using a discrete wavelet transform, includes shifting the digital image data before the discrete wavelet transform into a lower bit side by a predetermined number of bits, and reducing the number of effective bits to create digital image data different from the digital image data.

According to this configuration, like the fourth embodiment, high-speed encoding can be implemented and also the amount of memory used can be reduced.

In addition, according to a twenty-fifth aspect of the invention, a digital image encoding method, which encodes digital image data using a discrete wavelet transform, includes performing the coefficient bit shift processing according to any one of the nineteenth and twenty-second aspects of the invention, and performing the pre-transformation bit shift processing according to the twenty-third or twenty-fourth aspect of the invention.

According to this configuration, like the seventh aspect of the invention, since the bit shift processings are performed before and after the discrete wavelet transform processing and thus the number of effective bits are reduced. Therefore, high-speed encoding can be implemented and also the amount of memory used can be reduced.

In addition, according to a twenty-sixth aspect of the invention, in the digital image encoding method according to any one of the nineteenth to twenty-fifth aspects of the invention, before the discrete wavelet transform, the component transformation processing is performed to transform the digital image data into a color space that depends on human visual characteristics.

According to this configuration, like the eighth aspect of the invention, since the component transformation processing of digital image data can be performed before the discrete wavelet transform, in the subsequent bit shift processing, it is possible to concentrate the bit shift processing on components whose degradation is difficult to perceive with the human eye, as described above. Therefore, more appropriate encoding can be implemented.

In addition, according to a twenty-seventh aspect of the invention, in the digital image encoding method according to the nineteenth or twentieth aspect of the invention, the component transformation processing may be a color transformation processing to transform the digital image data into a luminance component and a color difference component.

According to this configuration, like the ninth aspect of the invention, information included in the image is concentrated on the luminance component, such that it is possible to perform the bit shift processing on the color difference component insensitive to the human visual characteristics. Therefore, more appropriate encoding can be implemented.

In addition, according to a twenty-eighth aspect of the invention, there is provided a digital image decoding method which decodes encoded data encoded by the digital image encoding method according to the nineteenth or twentieth aspect of the invention into digital image data close to original digital image data using a discrete wavelet reverse transformation. The digital image decoding method includes shifting a wavelet coefficient before the discrete wavelet reverse transformation into an upper bit side by a predetermined number of bits, and increasing the number of effective bits to create a wavelet coefficient different from the wavelet coefficient.

According to this configuration, it is possible to decode encoded data encoded by the digital image encoding method according to the nineteenth or twentieth aspect of the invention, without damaging the amount of data. Therefore, an image, which is not visually perceived as or extremely close to original digital image data (original image: BMP file), or a high-quality image corresponding to reproduction image quality (compression ratio, or the like) can be provided.

In addition, according to a twenty-ninth aspect of the invention, in the digital image decoding method according to the twenty-eighth aspect of the invention, when the bit shift processing at the time of encoding is performed on some sub-band coefficients among sub-band coefficients constituting the wavelet coefficient, the reverse coefficient bit shift processing may be performed only on the sub-band coefficients, on which the bit shift processing is performed.

According to this configuration, data close to the digital image data before encoding can be decoded, and thus an image close to the original image can be reproduced.

In addition, according to a thirtieth aspect of the invention, in the digital image decoding method according to the twenty-eighth aspect of the invention, when the different bit shift processings are performed on the respective sub-band coefficients constituting the wavelet coefficient, the reverse bit shift processing corresponding to the bit shift processing may be performed.

According to this configuration, data close to the digital image data before encoding can be decoded, and thus an image close to the original image can be reproduced.

In addition, according to a thirty-first aspect of the invention, there is provided a digital image decoding method which decodes encoded data encoded by the digital image encoding method according to the twenty-fourth aspect of the invention into digital image data close to original digital image data using a discrete wavelet reverse transformation. The digital image decoding method includes shifting the digital image data to an upper bit side by a predetermined number of bits with respect to digital image data after the discrete wavelet reverse transformation, and increasing the number of effective bits to create digital image data different from the digital image data.

According to this configuration, it is possible to decode encoded data encoded by the digital image encoding method according to the twenty-fourth aspect of the invention, without impairing the amount of data. Therefore, an image, which is not visually perceived as or extremely close to original digital image data (original image: BMP file), or a high-quality image corresponding to reproduction image quality (compression ratio, or the like) can be provided.

In addition, according to a thirty-second aspect of the invention, there is provided a digital image decoding method which, using the discrete wavelet reverse transformation, decodes data encoded using a discrete wavelet transform. The digital image decoding method includes the reverse coefficient bit shift processing according to any one of the twenty-eighth to thirtieth aspects of the invention, and a reverse bit shift processing according to the thirty-first aspect of the invention.

According to this configuration, since the reverse bit shift processings are performed before and after the discrete wavelet transform and thus the number of effective bits is increased, an image close to the original image can be reproduced.

In addition, according to a thirty-third aspect of the invention, the digital image decoding method according to any one of the twenty-eighth to thirty-second aspects of the invention may further include a component reverse transformation processing to transform the digital image data from a color space that depends on human visual characteristics into an image signal that does not depend on the human visual characteristics, after the discrete wavelet reverse transformation.

According to this configuration, when the digital image data before encoding includes a plurality of components, such as RGB or the like, image data obtained by performing the reverse bit shift processing before or after the discrete wavelet transform processing can be decoded into digital image data having the original plurality of components.

In addition, according to a thirty-fourth aspect of the invention, in the digital image decoding method according to the thirty-third aspect of the invention, the component reverse transformation processing may perform a color transformation processing to transform the digital image data into an image signal having a luminance component and a color difference component.

According to this configuration, when the digital image data before the bit shift processing includes the luminance component and the color difference component, image data, which is obtained by performing the reverse bit shift processing before or after the discrete wavelet transform processing can be transformed into the image signal having the original luminance component and the color difference component, can be decoded into digital image data close to original digital image data.

In addition, according to a thirty-fifth aspect of the invention, a digital image encoding program, which encodes digital image data using a discrete wavelet transform, causes a computer to shift a wavelet coefficient after the discrete wavelet transform into a lower bit side by a predetermined number of bits to truncate a lower bit, and reduce the number of effective bits to create a wavelet coefficient different from the wavelet coefficient.

According to this configuration, like the first aspect of the invention, the number of effective bits of the wavelet coefficient after the discrete wavelet transform is reduced, and thus the amount of data to be processed in the subsequent processing, such as coefficient bit modeling processing or arithmetic encoding processing, is markedly reduced. Therefore, since the load is markedly reduced, encoding can be performed at a high speed and also the amount of memory used can be markedly reduced when encoding is performed in hardware.

In addition, the program may be implemented in software using a computer system, such that it is possible to easily or economically implement the program, as compared with the case in which dedicated hardware is prepared to implement the program.

In addition, according to a thirty-sixth aspect of the invention, a digital image encoding program which encodes digital image data using a discrete wavelet transform, causes a computer to shift a wavelet coefficient after the discrete wavelet transform to a lower bit side by a predetermined number of bits, and create a wavelet coefficient different from the wavelet coefficient from the remaining bits after the bit shift processing.

According to this configuration, like the first aspect of the invention, the number of effective bits of the wavelet coefficient after the discrete wavelet transform is reduced and the amount of data is markedly reduced, and thus the load to be processed in the subsequent processing, such as coefficient bit modeling processing or arithmetic encoding processing, is markedly reduced. Therefore, encoding can be performed at a high speed and also the amount of memory used can be markedly reduced when encoding is performed in hardware.

In addition, the program can be implemented in software using a computer system, such that it is possible to easily or economically implement the program, as compared with the case in which dedicated hardware is prepared to implement the program.

In addition, according to a thirty-seventh aspect of the invention, in the digital image encoding program according to the thirty-fifth or thirty-sixth aspect of the invention, the bit shift processing may be performed on the sub-band coefficients including a high frequency component among the sub-band coefficients constituting the wavelet coefficient.

According to this configuration, like the fourth aspect of the invention, high-speed encoding can be implemented and also image degradation caused by the bit shift processing can be suppressed to the minimum. Further, like the thirty-fifth aspect of the invention, the program can be implemented in software using a computer system, such that it is possible to easily or economically implement the program, as compared with the case in which dedicated hardware is prepared to implement the program.

In addition, according to a thirty-eighth aspect of the invention, in the digital image encoding program according to the thirty-fifth or thirty-sixth aspect of the invention, the digital image encoding program may cause the computer to calculate degrees of contribution to image quality for the respective sub-band coefficients constituting the wavelet coefficient, and perform different bit shift processings on the sub-band coefficients according to the degrees of contribution.

According to this configuration, like the fifth aspect of the invention, it is possible to implement high-speed encoding, and also to suppress image degradation caused by the bit shift processing to the minimum. In addition, like the thirty-fifth aspect of the invention, the program can be implemented in software using a computer system, such that it is possible to easily or economically implement the program, as compared with the case in which dedicated hardware is prepared to implement the program.

In addition, according to a thirty-ninth aspect of the invention, a digital image encoding program, which encodes digital image data using a discrete wavelet transform, causes a computer to shift the digital image data to an upper bit side by a predetermined number of bits with respect to digital image data before the discrete wavelet transform, and increase the number of effective bits to create digital image data different from the digital image data.

According to this configuration, like the sixth aspect of the invention, it is possible to implement high-speed encoding, and also to the amount of memory used can be reduced. In addition, like the thirty-fifth aspect of the invention, the program can be implemented in software using a computer system, such that it is possible to easily or economically implement the program, as compared with the case in which dedicated hardware is prepared to implement the program.

In addition, according to a fortieth aspect of the invention, a digital image encoding program, which encodes digital image data using a discrete wavelet transform, causes a computer to execute a coefficient bit shift processing according to any one of the thirty-fifth to thirty-eighth aspects of the invention, and a pre-transformation bit shift processing according to the thirty-ninth aspect of the invention.

According to this configuration, like the seventh aspect of the invention, the bit shift processings are performed before and after the discrete wavelet transform processing and thus the number of effective bits is reduced. Therefore, high-speed encoding can be implemented and the amount of memory used can be reduced. In addition, like the thirty-fifth aspect of the invention, the program can be implemented in software using a computer system, such that it is possible to easily or economically implement the program, as compared with dedicated hardware is prepared to implement the program.

In addition, according to a forty-first aspect of the invention, in the digital image encoding program according to any one of the thirty-fifth to fortieth aspects of the invention, the program may cause the computer to execute a component transformation processing to transform the digital image data into a color space that depends on the human visual characteristics, before the discrete wavelet transform.

According to this configuration, like the eighth aspect of the invention, it is possible to perform the component transformation processing of the digital image data before the discrete wavelet transform, and thus, in the subsequent bit shift processing, the bit shift processing can be concentrated on the components whose degradation is difficult to perceive with the human eye, as described above. Therefore, more appropriate encoding can be implemented. In addition, like the thirty-fifth aspect of the invention, the program can be implemented in software using a computer system, such that it is possible to easily or economically implement the program, as compared with the case in which dedicated hardware is prepared to implement the program.

In addition, according to a forty-second aspect of the invention, in the digital image encoding program according to the forty-first aspect of the invention, the component transformation processing may be a color transformation processing to transform the digital image data into a luminance component and a color difference component.

According to this configuration, like the ninth aspect of the invention, information included in the image is concentrated on the luminance component. Therefore, it is possible to perform the bit shift processing on the color difference component insensitive to the human eye, such that more appropriate encoding can be implemented. In addition, like the thirty-fifth aspect of the invention, the program can be implemented in software using a computer system, such that it is possible to easily or economically implement the program, as compared with the case in which dedicated hardware is prepared to implement the program.

In addition, according to a forty-third aspect of the invention, there is provided a computer readable recording medium having the digital image encoding program according to any one of the thirty-fifth to forty-second aspects of the invention.

According to this configuration, it can be ensured that the digital image encoding program, according to any one of the thirty-five to forty-two aspects of the invention, is provided to a receiver, such as a user or the like, through a computer readable recording medium, such as the CD-ROM, the DVD-ROM, the floppy disc, a semiconductor chip, or the like.

In addition, according to a forty-fourth aspect of the invention, there is provided a digital image decoding program which decodes encoded data encoded by the digital image encoding program according to the thirty-eighth aspect of the invention into digital image data close to original digital image data using a discrete wavelet reverse transformation. The digital image decoding program causes a computer to shift a wavelet coefficient before the discrete wavelet reverse transformation to a lower bit side by the predetermined number of bits to truncate a lower bit, and create a wavelet coefficient different from the wavelet coefficient from the remaining bits after the bit truncation processing.

According to this configuration, it is possible to decode encoded data encoded by the digital image encoding program, without damaging the amount of data. Therefore, like the tenth aspect of the invention, an image, which is not visually perceived as or extremely close to original digital image data (original image: BMP file), or a high-quality image corresponding to reproduction image quality (compression ratio, or the like) can be provided. In addition, like the thirty-fifth aspect of the invention, the program can be implemented in software using a computer system, such that it is possible to easily or economically implement the program, as compared with the case in which dedicated hardware is prepared to implement the program.

In addition, according to a forty-fifth aspect of the invention, in the digital image decoding program according to the forty-fourth aspect of the invention, when the bit shift processing at the time of encoding is performed only on some sub-band coefficients among sub-band coefficients constituting the wavelet coefficient, the reverse coefficient bit shift processing may be performed only on the sub-band coefficients, on which the bit shift processing is performed.

According to this configuration, like the eleventh aspect of the invention, it is possible to decode data close to the digital image data before encoding and to thus reproduce an image close to the original image. In addition, like the thirty-fifth aspect of the invention, the program can be implemented in software using a computer system, such that it is possible to easily or economically implement the program, as compared with the case in which dedicated hardware is prepared to implement the program.

In addition, according to a forty-sixth aspect of the invention, in the digital image decoding program according to the forty-fourth aspect of the invention, when different bit shift processings are performed on the respective sub-band coefficients constituting the wavelet coefficient, the reverse bit shift processing corresponding to the bit shift processing may be performed.

According to this configuration, like the twelfth aspect of the invention, it is possible to decode data close to the digital image data before encoding and to thus reproduce an image close to the original image. In addition, like the thirty-fifth aspect of the invention, the program can be implemented in software using a computer system, such that it is possible to easily or economically implement the program, as compared with the case in which dedicated hardware is prepared to implement the program.

In addition, according to a forty seventh aspect of the invention, there is provided a digital image decoding program which decodes encoded data encoded by the digital image encoding program according to the thirty-ninth aspect of the invention into digital image data close to original digital image data using a discrete wavelet reverse transformation. The digital image decoding program causes a computer to shift the digital image data to an upper bit side by a predetermined number of bits with respect to digital image data after the discrete wavelet reverse transformation to add new bits to a lower bit side, and create new digital image data from the total bits after being added in the bit addition processing.

According to this configuration, since it is possible to decode encoded data encoded by the digital image encoding program, without damaging the amount of data, like the thirteenth aspect of the invention, data close to the digital image data before encoding can be recorded, and thus an image close to an original image can be reproduced. In addition, like the thirty-fifth aspect of the invention, the program can be implemented in software using a computer system, such that it is possible to easily or economically implement the program, as compared with the case in which dedicated hardware is prepared to implement the program.

In addition, according to a forty-eighth aspect of the invention, there is provided a digital image decoding program which, using a discrete wavelet reverse transformation, decodes data encoded using the discrete wavelet transform. The digital image decoding program causes a computer to execute the reverse coefficient bit shift processing according to any one of the forty-fourth to forty-sixth aspects of the invention and the reverse bit shift processing according to the forty-sixth aspect of the invention.

According to this configuration, like the fourteenth aspect of the invention, since the reverse bit shift processings are performed before and after the discrete wavelet transform processing, and thus the number of effective bits is increased, an image close to the original image can be reproduced. In addition, like the thirty-fifth aspect of the invention, the program can be implemented in software using a computer system, such that it is possible to easily or economically implement the program, as compared with the case in which dedicated hardware is prepared to implement the program.

In addition, according to a forty-ninth aspect of the invention, the digital image decoding program according to any one of the forty-fourth to forty-eighth aspects of the invention, may cause the computer to execute, after the discrete wavelet reverse transformation, the component reverse transformation processing to transform the digital image data from a color space that depends on the human visual characteristics to an image signal that does not depend on the human visual characteristics.

According to this configuration, like the fifteenth aspect of the invention, when the digital image data before encoding includes a plurality of components, such as RGB or the like, image data, which is obtained by performing the reverse bit shift processing before or after the discrete wavelet transform processing, can be decoded into digital image data having a plurality of original components. In addition, like the twenty-ninth aspect of the invention, the program can be implemented in software using a computer system, such that it is possible to easily or economically implement the program, as compared with dedicated hardware is prepared to implement the program.

In addition, according to a fiftieth aspect of the invention, in the digital image decoding program according to the thirty-eighth aspect of the invention, the component reverse transformation processing may perform a color transformation processing to transform the digital image data from a luminance component and a color difference component into an image signal.

According to this configuration, like the sixteenth aspect of the invention, when the digital image data before the bit shift processing includes the luminance component and the color difference component, image data, which is obtained by performing the reverse bit shift processing before or after the discrete wavelet transform processing, can be transformed into an image signal having the original luminance and color difference components and decoded into a digital image data close to the original digital image data. In addition, like the thirty-fifth aspect of the invention, the program can be implemented in software using a computer system, such that it is possible to easily or economically implement the program, as compared with the case in which dedicated hardware is prepared to implement to the program.

In addition, according to a fifty-first aspect of the invention, there is provided a computer readable recording medium having the digital image decoding program according to any one of the forty-fourth to fiftieth aspects of the invention recorded thereon.

According to this configuration, it can be ensured that the digital image decoding program according to any one of the forty-fourth and fiftieth aspects of the invention is provided to a receiver, such as a user or the like, through a computer readable recording medium, such as the CD-ROM, the DVD-ROM, the floppy disc, a semiconductor chip, or the like.

BRIEF DESCRIPTION OF THE DRAWINGS

The invention will be described with reference to the accompanying drawings, wherein like numbers reference like elements, and wherein.

DESCRIPTION OF THE EMBODIMENTS

Preferred embodiments of the invention will now be described in detail with reference to the accompanying drawings.

FIGS. 1 to 4 show a first embodiment of a digital image encoding device 100 according to the invention, a digital image encoding method using the digital image encoding device 100, and a digital image encoding program.

Figure 1:
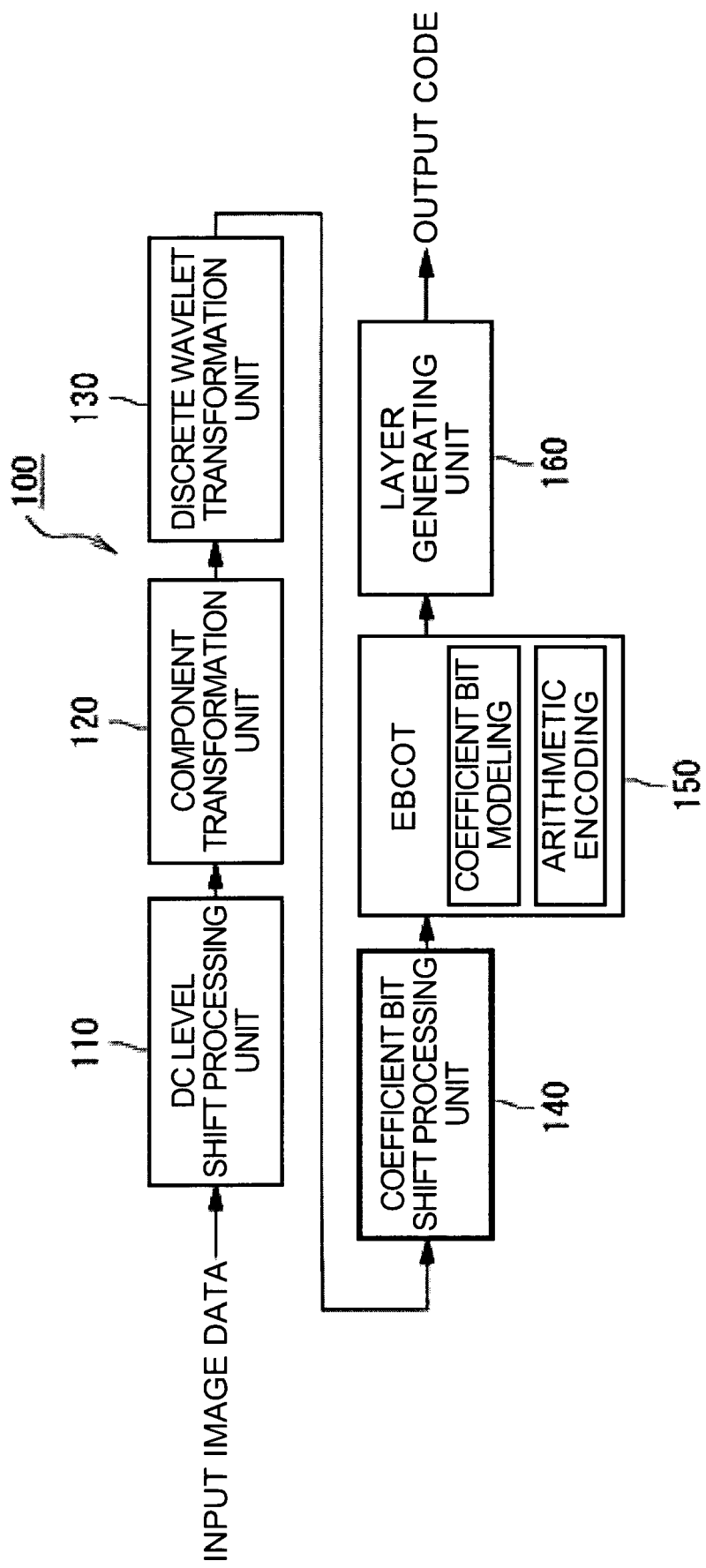
FIG. 1 is a block diagram showing a first embodiment of a digital image encoding device.
Figure 2:
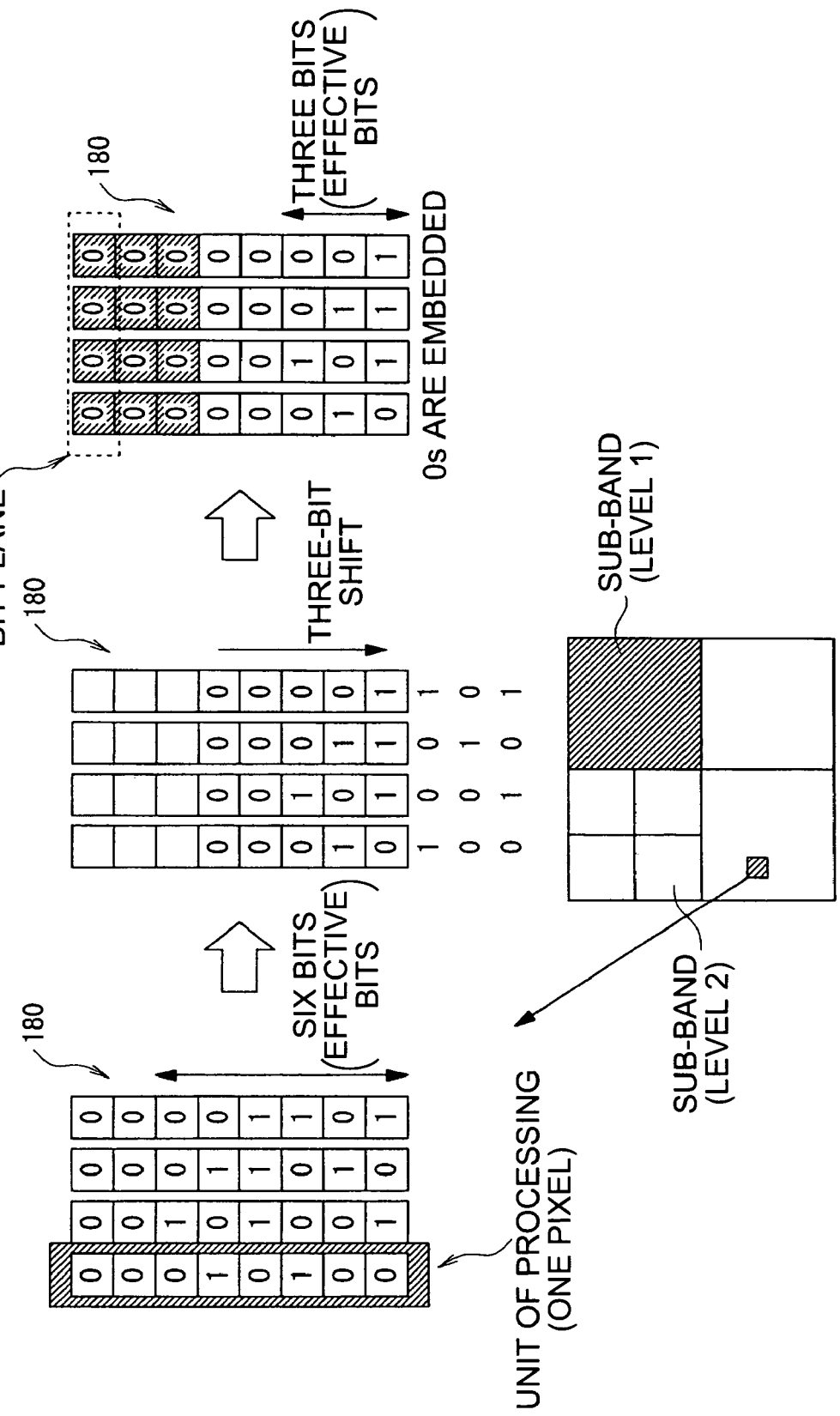
FIGS. 2A to 2D are diagrams conceptually showing an example of a bit shift processing at the time of encoding.

As shown in FIG. 1, the digital image encoding device 100 includes a DC level shift processing unit 110, a component transformation unit 120, a discrete wavelet transform unit 130, a coefficient bit shift processing unit 140, an EBCOT (Embedded Block Coding with Optimal Truncation) 150, and a layer generating unit 160.

Among these, the configuration, excluding the coefficient bit shift processing unit 140, may appear roughly similar to the basic configuration of a related art digital image encoding device using an encoding technology of the above-described JPEG2000 standard. Therefore, the digital image encoding device 100 of the invention has a feature in that, in addition to this configuration, the coefficient bit shift processing unit 140 is newly attached between the discrete wavelet transform unit 130 and the EBCOT 150.

A function of each part in the digital image encoding device 100 of the invention and a digital image encoding method using the digital image encoding device 100 will now be described. In addition, the functions of other parts, excluding the coefficient bit shift processing unit 140, are the same as those in the related art, described above, and therefore only the association with the function of the coefficient bit shift processing unit 140 will be briefly described.

First, digital image data (such as a BMP file or the like) to be a target of an encoding processing is first inputted to the DC level shift processing unit 110, and a DC level shift transformation processing is performed in order to enhance the efficiency of the wavelet transform. For example, when the original image is an 8-bit component and expressed as an unsigned integer of 'from 0 to 255', this is level shifted to 'from −127 to 127' and the mean is set to '0', for example, thereby removing a DC offset value.

Next, when the digital image data is color image data, after DC level shift transformation, the color image data is inputted to the component transformation unit 120 and a color transformation processing is performed in order to efficiently compress the color image data. For example, when the input image signal is an RGB signal, a transformation to a luminance and color difference space, such as a Y, Cb, Cr color space or a YUV color space, is performed.

Next, the digital image data passing through the component transformation unit 120 is inputted to the discrete wavelet transform unit 130 and thus a forward discrete wavelet transform processing is performed. A basic processing of the forward discrete wavelet transform is to apply low pass filtering and high pass filtering to the input original signal by the number of division levels, and to output each down-sampled sub-band coefficient.

Figure 14:
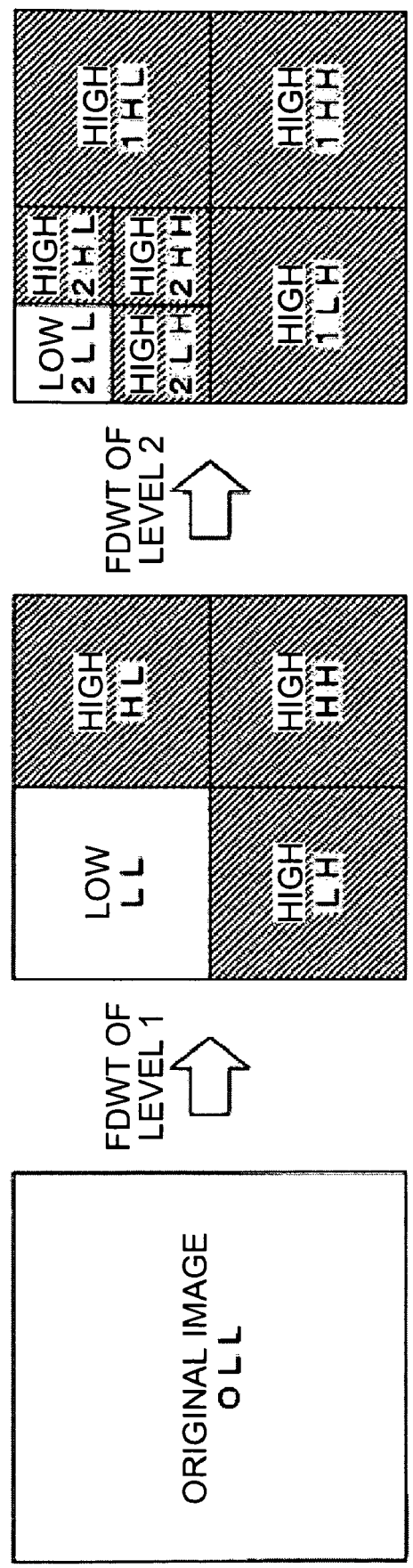
FIGS. 14A to 14C are diagrams conceptually showing a state in which an original image is divided into a level 1 sub-band and a level 2 sub-band by a discrete wavelet transform processing.

In FIGS. 14A to 14C, the original image (FIG. 14A) is divided into the number of division levels of '1', and the number of division levels of '2', and each divided sub-band signal (wavelet coefficient) is expressed in combination with an index level indicating a level of the sub-band division and four symbols, such as 'LL', 'HL', 'LH' and 'HH', that is, spatial frequencies of the respective sub-bands.

For example, the sub-band '0LL' corresponds to the original image before the transformation processing, and in a case of the level 1, a filtering processing is applied to the sub-band LL in vertical and horizontal directions in that order. At this time, for each of the vertical and horizontal directions, two selections can be made between the low pass filter and the high pass filter, so that the following four sub-bands are generated.

Sub-band LL: Signal subjected to low pass filtering in both the vertical and horizontal directions and down-sampled at a rate of 2:1.

Sub-band HL: Signal subjected to low pass filtering in the vertical direction and down-sampled at a rate of 2:1.

Sub-band LH: Signal subjected to high pass filtering in the vertical direction and down-sampled at a rate of 2:1.

Sub-band HH: Signal subjected to high pass filtering in both the vertical and horizontal directions and down-sampled at a rate of 2:1.

In addition, FIG. 14B shows an arrangement of the division level 1 of the sub-bands 'LL', 'HL', 'LH', and 'HH', and FIG. 14C shows an arrangement of the division level 2 in which the sub-band 'LL' among these is further divided.

Next, with the above-described arrangement, the image data, on which the related art forward wavelet transform processing is performed by the discrete wavelet transform unit 130, is inputted to the coefficient bit shift processing unit 140, which is a feature of the invention, and thus a bit shift processing is performed for each wavelet coefficient (for each pixel) of each signal (such as Y, Cb, Cr, or the like).

As shown in FIG. 2A, the bit shift processing is performed for each sub-band (level 1 and level 2) so as to shift the wavelet coefficient to a lower bit side by a predetermined number of bits and reduce the number of effective bits to create a wavelet coefficient different from the wavelet coefficient.

FIGS. 2A to 2D show four continuous pixels in the sub-band '1LH' of the level 1. Specifically, FIGS. 2A to 2D show a state in which every three bits are bit-shifted from a coefficient storing unit 180 in a memory to the low bit side.

For example, as shown in FIG. 2B, when a pixel value of each pixel serving as a unit of processing can be expressed in eight bits and six bits from the lower side are effective bits, only three bits are shifted to the lower bit side and the lower three bits are truncated, as shown in FIG. 2C. Then, only three bits on a blank upper bit side are added to a bit plane having '0' bits in order to reduce the effective bits from six bits to three bits, as shown in FIG. 2D.

In addition, when a pixel value of one pixel is a gray-scale level of 41 ($2^0+2^3+2^5$) expressed in $(00101001)_2$, by shifting three bits of this from the coefficient storing unit 180 to the lower bit side, the lower three bits $(001)_2$ are truncated, the pixel value becomes (00000101 (a bit plane for upper three bits))$_2$ and the amount of data of the pixel value is reduced up to a gray-scale level of 5 ($2^0+2^2$).

According to this configuration, the total number of effective bits of the image data is reduced, and, as shown in FIG. 1, the amount of data to be performed by the subsequent EBCOT (coefficient bit modeling processing, arithmetic encoding processing) 150 or a layer generating unit 160 is markedly reduced. Therefore, since the load is markedly reduced, high-speed encoding can be performed. Further, the amount of memory used can be markedly reduced when each processing is performed in hardware.

Figure 3:
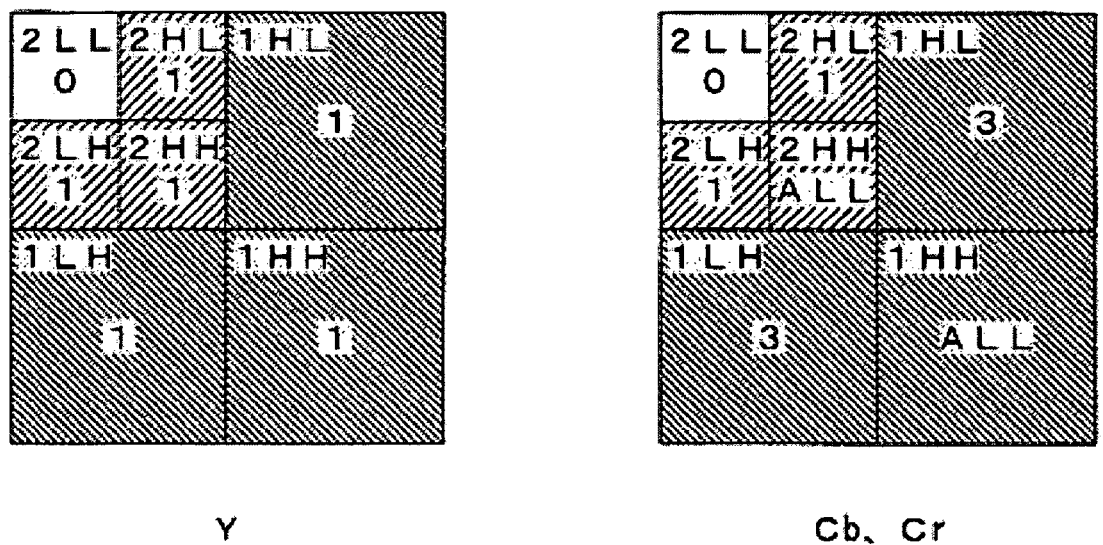
FIG. 3 is a diagram showing an example of a bit shift processing for each sub-band of luminance and color difference components.
Figure 4:
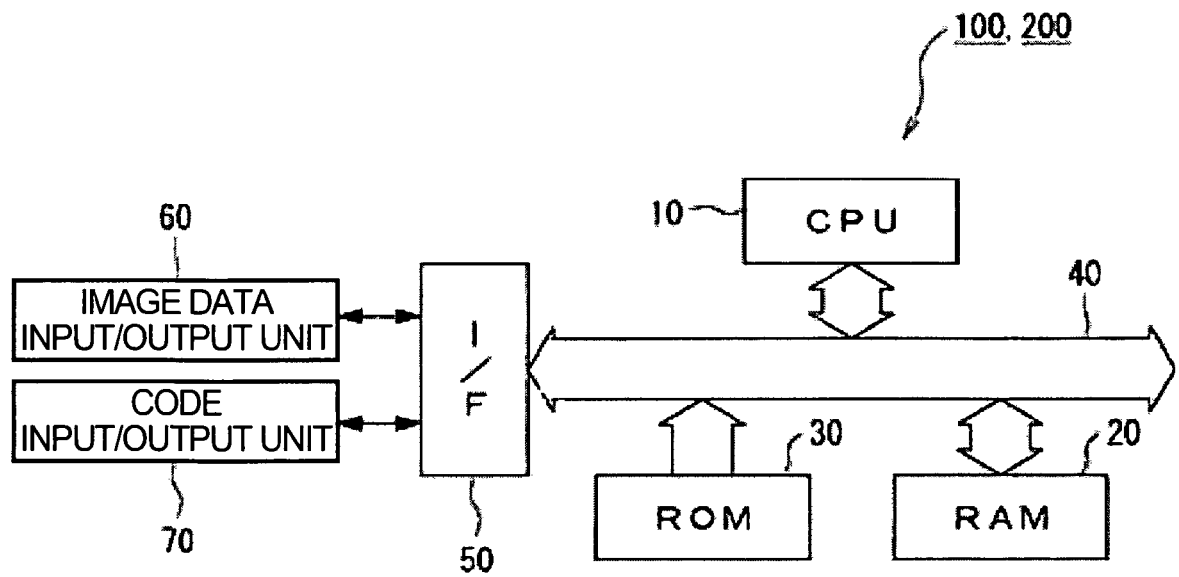
FIG. 4 is a diagram showing a hardware configuration of a digital image encoding device and a digital image decoding device.

In addition, it is preferable that, as shown in FIG. 3, the amount of the bit shift processing is changed for each kind of sub-band, rather than for each sub-band coefficient as a whole.

Specifically, as described above, according to the human visual characteristics, the human eye is sensitive to a low frequency component rather than a high frequency component, and in addition, sensitive to a luminance component (Y) rather than a color difference component (Cb, Cr). For this reason, when the number to be bit-shifted for each frequency component or each component is increased, image degradation caused by the human visual characteristics due to the reduction in amount of data through the bit shift processing can be suppressed to the minimum.

For example, as shown in FIG. 3, as regards the sub-band of the luminance component (Y) sensitive to the human visual characteristics, the amount of bit shift is suppressed to '0', or at least '1'. Further, as regards the color difference component (Cb, Cr) insensitive to the human visual characteristics, more than three bits for each sub-band (1HL, 1HH, or 1HL) including the high frequency component and more than one bit for each sub-band (2HL or 2HL) partially including the low frequency component (there is no bit shift processing for the sub-band 2LL having the low frequency component) are performed in an irregular bit shift processing. Therefore, even when the amount of data is markedly reduced, the perceivable degradation of the image due to the human visual characteristics can be suppressed to the minimum.

In addition, the sub-band coefficient in which the amount of data is reduced by the bit shift processing is transmitted to the EBCOT 150 in the same manner as the related art and divided into small blocks, called code blocks, through the coefficient bit modeling processing. The sub-band coefficient in the code block has the amplitude expanded in a bit plane from MSB to LSB, and an arithmetic encoding processing is performed after the encoding in a predetermined encoding pass is completed. In addition, the arithmetic encoding processing uses a series of codes and context information, which is obtained by the coefficient bit modeling processing, and further performs non-strain compression on the sub-band coefficient using an entropy encoding so as to generate a bit stream. Next, the bit stream constitutes an embedded code using the layer generating unit 160 in consideration of image quality and is grouped into a unit called a layer and the code is output. In addition, the processings subsequent to the EBCOT 150 are the same as those in standard JPEG2000.

Moreover, the digital image encoding device 100 of the invention, the digital image encoding method using the digital image encoding device 100, a digital image decoding device 200, and a digital image encoding method using the digital image decoding device 200 may be implemented in a general computer system, such as a personal computer (PC). In this case, these can be implemented by combining a digital image encoding program that implements the functions of the DC level shift processing unit 110, the component transformation unit 120, the discrete wavelet transform unit 130, the coefficient bit shift processing unit 140, and the EBCOT 150, the layer generating unit 160 described above, and hardware shown in FIG. 4 with one another.

Specifically, in the digital image encoding device 100, a central processing unit (CPU) 10, which is a central operation processing device responsible for various controls and arithmetic processings, a random access memory (RAM) 20, which constitutes a main storage, and a read only memory (RAM) 30, which is a read-only storage, are connected to each other with a bus 40, which includes a peripheral component interconnect (PCI) bus or an industrial standard architecture (ISA) bus. Further, an image data input/output unit 60 for inputting/outputting image data and a code input/output unit 70 for inputting/outputting compressed code data are connected to the bus 40 via an input/output interface (I/F) 50. In addition, when power is turned on, the digital image encoding (decoding) program stored in the ROM 30 is loaded on the RAM 20, and the CPU 10 performs sequentially instructions according to the description of the digital image encoding (decoding) program loaded on the RAM 20 and performs the processings of the respective parts at a high speed.

In addition, the invention can be implemented in an LSI designed and manufactured in a specific purpose, such as an application specific integrated circuit (ASIC) or the like, so that, when the digital image encoding device and the digital image decoding device of the invention are incorporated into an image processing system, such as a digital camera or the like, the devices can be implemented in such a manner.

Figure 5:
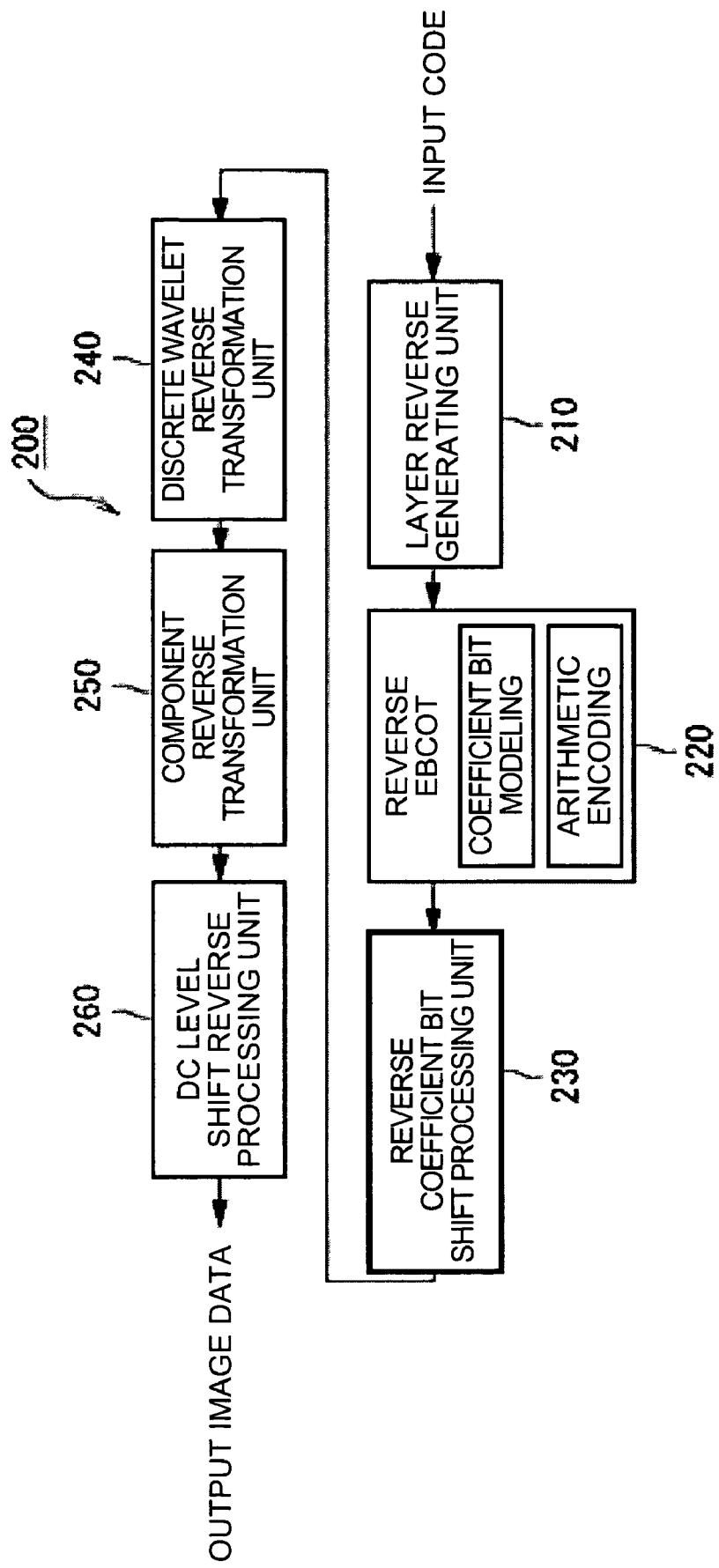
FIG. 5 is a block diagram showing a first embodiment of a digital image decoding device.
Figure 6:
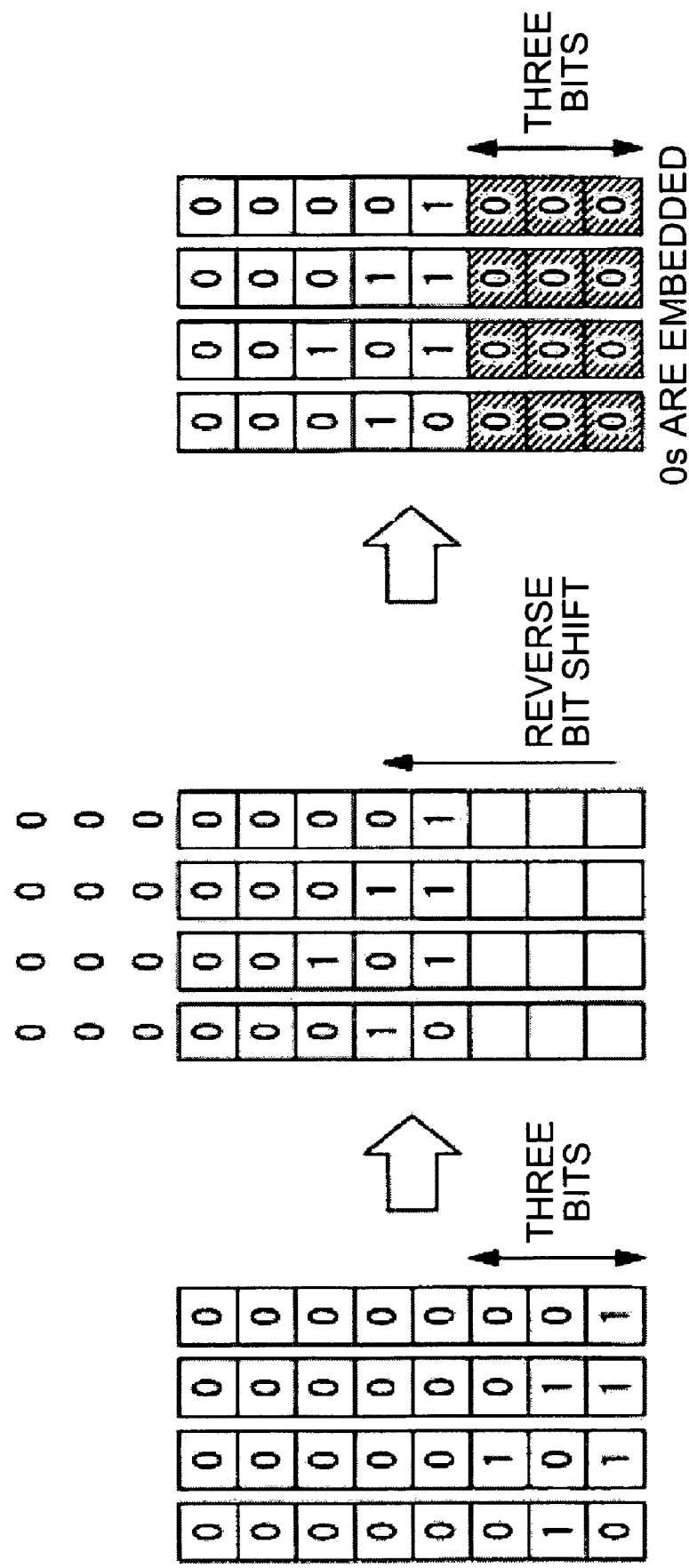
FIGS. 6A to 6C are diagrams showing an example of a reverse bit shift processing at the time of decoding.
Figure 7:
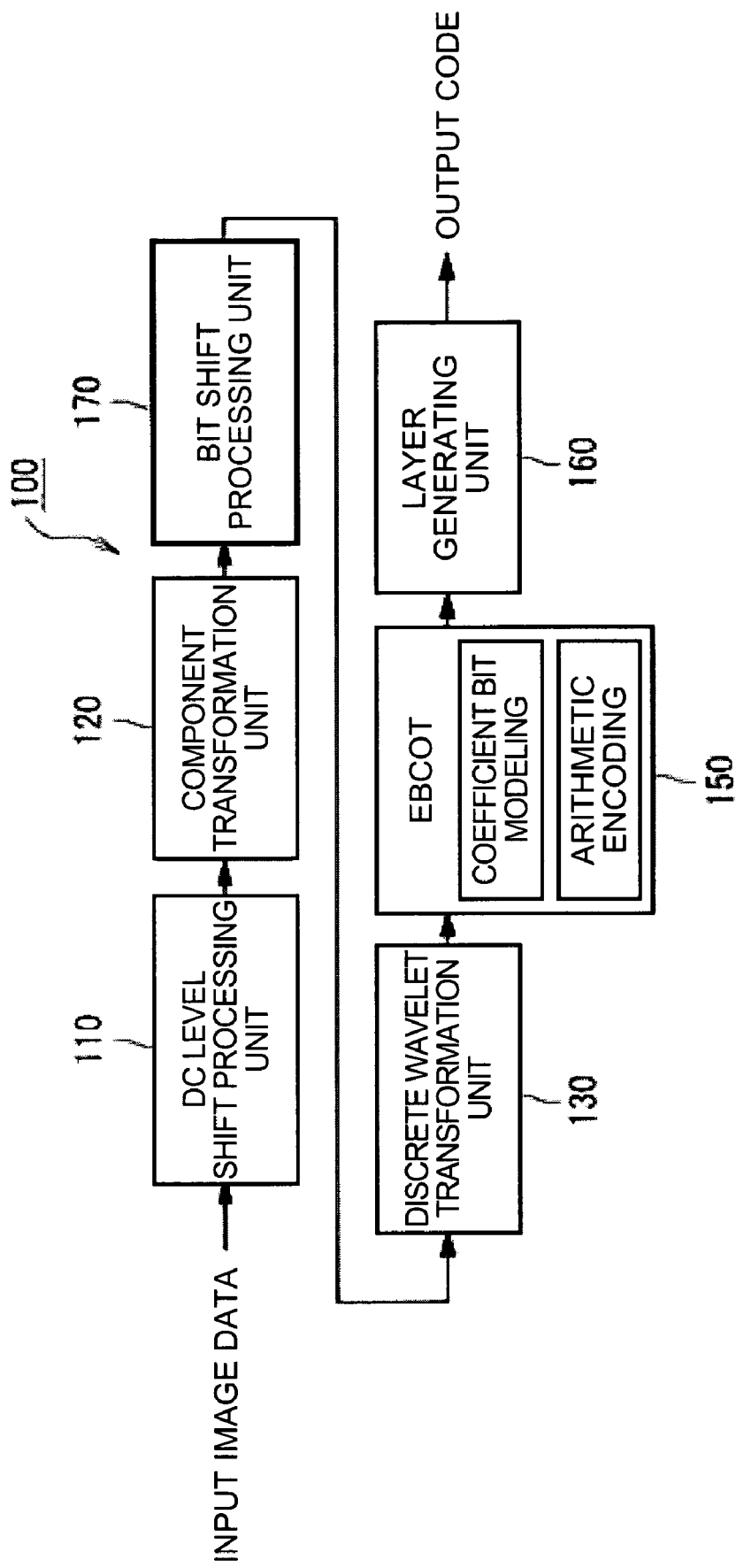
FIG. 7 is a block diagram showing a second embodiment of a digital image encoding device.

Next, FIGS. 5 to 7 show a first embodiment of the digital image decoding device 200 and the digital image decoding method using the digital image decoding device 200, which decodes data encoded by the above-described digital image encoding device 100 of the invention and the digital image encoding method (or digital image encoding program) using the digital image encoding device 100 into digital image data close to original digital image data.

As shown in FIG. 5, the digital image decoding device 200 broadly includes a layer reverse generating unit 210, a reverse EBCOT 220, a reverse coefficient bit shift processing unit 230, a discrete wavelet reverse transformation unit 240, a component reverse transformation unit 250, and a DC level shift reverse processing unit 260.

Among these, the configuration, excluding the reverse coefficient bit shift processing unit 230, is almost the same as the basic configuration of a related art digital image decoding device using an encoding technology of above-described JPEG2000. Therefore, the digital image decoding device 200 of the invention has a feature in that, in addition to this configuration, the reverse coefficient bit shift processing unit 230 is newly attached between the discrete wavelet reverse transformation unit 240 and the reverse EBCOT 220.

In addition, with the digital image decoding device 200 constituted in such a manner, in order to decode data encoded by the above-described digital image encoding device 100 according to the invention, as shown in FIG. 5, code data is first inputted to the layer reverse generating unit 210 and is transformed into data before the layer generation processing. Subsequently, the transformed data is inputted to the reverse EBCOT 220 to return the sub-band coefficient before the arithmetic encoding processing and the coefficient bit modeling processing. Next, the sub-band coefficient is inputted to the reverse coefficient bit shift processing unit 230 and the reverse bit shift processing is performed, as shown in FIG. 6.

Specifically, the bit shift processing by the reverse coefficient bit shift processing unit 230 performs a bit shift processing in the opposite direction to the bit shift processing to the lower bit performed by the coefficient bit shift processing unit 140 of the digital image encoding device 100. For example, when a three-bit bit shift processing is performed to the lower bit side with respect to the pixel value of each pixel by the coefficient bit shift processing unit 140 at the time of decoding, as shown in FIGS. 6A and 6B, of the series of bits of each pixel, only three bits of the upper bit side are subjected to the reverse bit shift processing, and the upper three bits, that is, three bit planes of '0' bits added at the time of encoding are truncated as they are. Next, new three bit planes are added to positions, which are now blank ones, and filled with '0'. According to this configuration, the number of effective bits of each pixel is the same as the original pixel value, so that it is possible to restore the pixel value extremely close to the original pixel value.

For example, of the pixel value, in which the amount of data is reduced up to the gray-scale level of 5 through the bit shift processing at the time of decoding, only three bits of the upper bit side are subjected to the bit shift processing as they are, so that it is possible to cause the pixel value to be $(00101000)_2$, a displayed gray-scale level to be a gray-scale level of 40, and to restore the pixel value almost the same as the original gray-scale level (the gray-scale level of 41).

In addition, the sub-band coefficient, on which the reverse coefficient bit shift processing is performed, is then restored to the image data close to the original image data and is outputted through the discrete wavelet reverse transformation unit 240, the component reverse transformation unit 250, and the DC level shift reverse processing unit 260.

According to this configuration, the image data of the amount of data almost the same as or extremely close to the image data before encoding can be restored, and high-quality digital data having little image quality degradation at the time of encoding or decoding can be obtained.

Next, FIG. 7 shows a digital image encoding device 100 according to a second embodiment of the invention.

As shown in FIG. 7, the digital image encoding device 100 includes a bit shift processing unit 170 corresponding to the coefficient bit shift processing unit 140 which is provided between the component transformation unit 120 and the discrete wavelet transform unit 130. The second embodiment is different from the first embodiment in that the bit shift processing is not performed on the sub-band coefficient after the discrete wavelet transform processing, but the bit shift processing is performed for the image data subjected to the component transformation processing before the discrete wavelet transform processing.

As described above, when the bit shift processing is performed on component data (image data) before the discrete wavelet transform processing, it is difficult to perform a careful bit shift processing for each sub-band, for example, after the discrete wavelet transform processing. However, it is possible to perform a predetermined bit processing for each component as a whole. Therefore, it is possible to reduce the load or processing time required for the bit shift processing, and also to achieve high-speed encoding. In addition, as a bit shift processing method by the bit shift processing unit 170, one or no bit processing is performed for the luminance component (Y) sensitive to the human visual characteristics, every 'three' bits are bit-shifted for the color difference component (Cb, Cr) sensitive to the human visual characteristics. As such, it is needles to say that the bit shift processing method is desirable to be changed according to the component characteristics.

According to this configuration, like the first embodiment, the total number of effective bits of image data is reduced, and the amount of data to be processed by, for example, the subsequent discrete wavelet transform unit 130, the EBCOT 150, and the layer generating unit 160 is markedly reduced. Therefore, since the load is markedly reduced, high-speed encoding can be implemented and the amount of memory used can be markedly reduced when each processing is performed on the special hardware.

Figure 8:
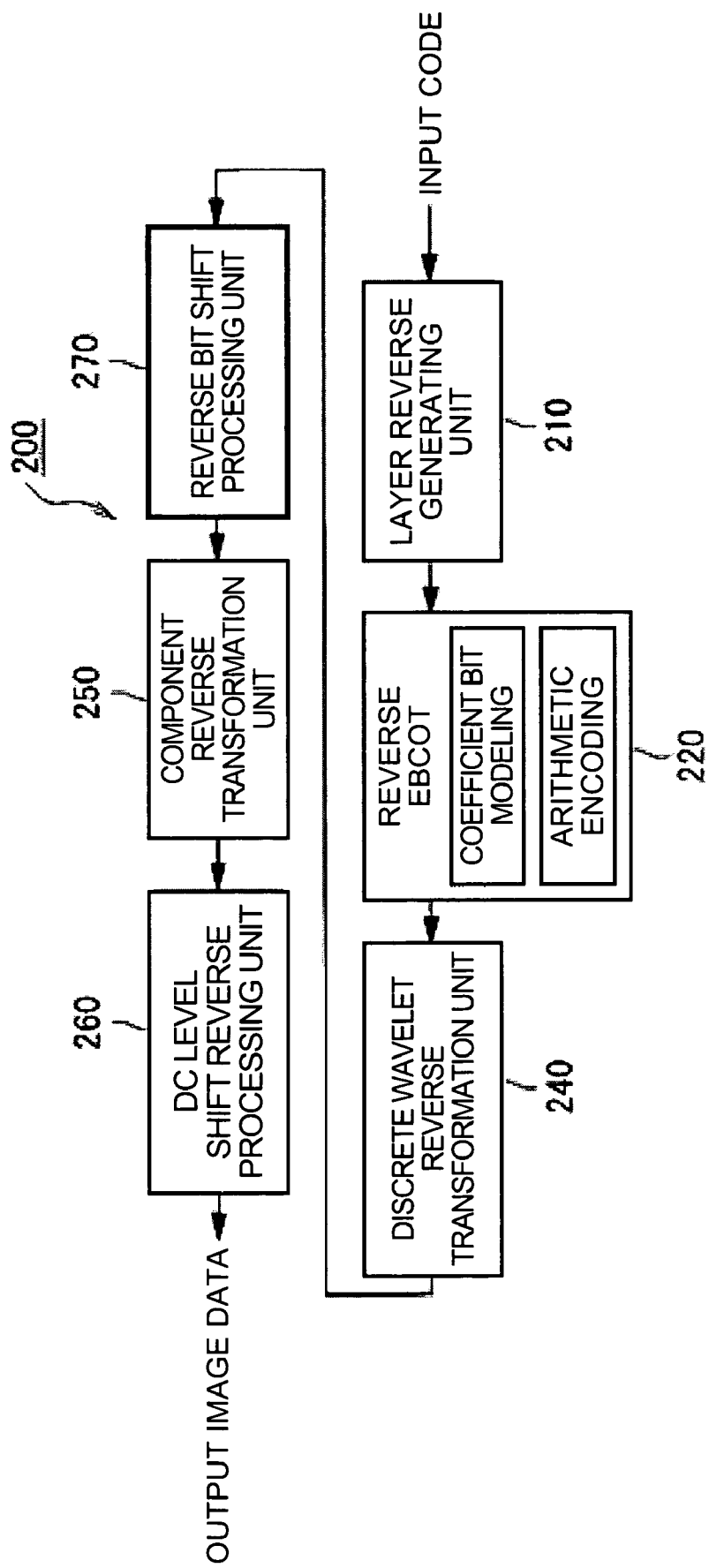
FIG. 8 is a block diagram showing a second embodiment of a digital image decoding device.

Further, FIG. 8 shows a second embodiment of a digital image decoding device 200 which decodes only data encoded by the digital image encoding device 100. The digital image decoding device has a bit shift processing unit 270, instead of the reverse coefficient bit shift processing unit 230 of the digital image decoding device 200 (FIG. 5) of the above-described first embodiment. The bit shift processing unit 270 is newly provided between the discrete wavelet reverse transformation unit 240 and the component reverse transformation unit 250.

Therefore, data encoded by the digital image encoding device 100 shown in FIG. 7 is decoded into component data through the layer reverse generating unit 210, the reverse EBCOT 220, and the discrete wavelet reverse transformation unit 240, and then is subjected to the reverse bit shift processing by the reverse bit shift processing unit 270 to be decoded up to the value almost the same as the original pixel value. Subsequently, data is decoded to digital image data close to original image data by the component reverse transformation unit 250 and the DC level shift reverse processing unit 260.

In addition, the reverse bit shift processing by the reverse bit shift processing unit 270 is performed in an opposite direction to the bit shift processing performed at the time of encoding. Therefore, when different bit shift processings are performed for the respective components in order to decode a high-quality image close to the original image, it is desirable that the reverse bit shift processing in the opposite direction to the bit shift processing is performed for each component.

In addition, a kind of bit embedded into (complementing) the lower bit region which is blank at the time of the reverse bit shift processing is not limited to a '0' bit. For example, as experimentally proven, if '1' is complemented appropriately according to the number of bit shift so as to satisfy the following equation 1, for example, such that the high-quality image is achieved, as compared with the case in which only '0' is filled up.

Complement Number of $1=2^{N-1}-1$, where $N$ is the number of bit shift  (1)

Figure 9A:
FIGS. 9A to 9C are diagrams conceptually showing an example of a reverse bit shift processing at the time of decoding according to the second embodiment.
Figure 9B:
Figure 9C:

From the equation 1, when the complement number is one bit, a bit '0' is inserted into the complement region, as shown in FIG. 9A. Further, when the complement number is two bits and three bits, two bits are '1' from the MSB and the LSB as shown in FIGS. 9B and 9C. Actually, a high-quality image close to the original image is restored, though a slight difference exists, even when all bits '0' are inserted.

In addition, as the result of the experiment, the bit complement processing based on the equation 1 can obtain a better output for the reverse bit shift processing before the component reverse transformation, rather than for the reverse bit shift processing before the discrete wavelet reverse transformation. Specifically, with the reverse bit shift processing before the component reverse transformation, the high-quality image close to the original image can be visually obtained by the human eye.

According to this configuration, like the first embodiment, it is possible to decode image data to almost the same amount of data as image data before encoding. Further, a high quality image data, which is not visually perceived as or extremely close to original digital image data (original image: BMP file) can be obtained.

Figure 10:
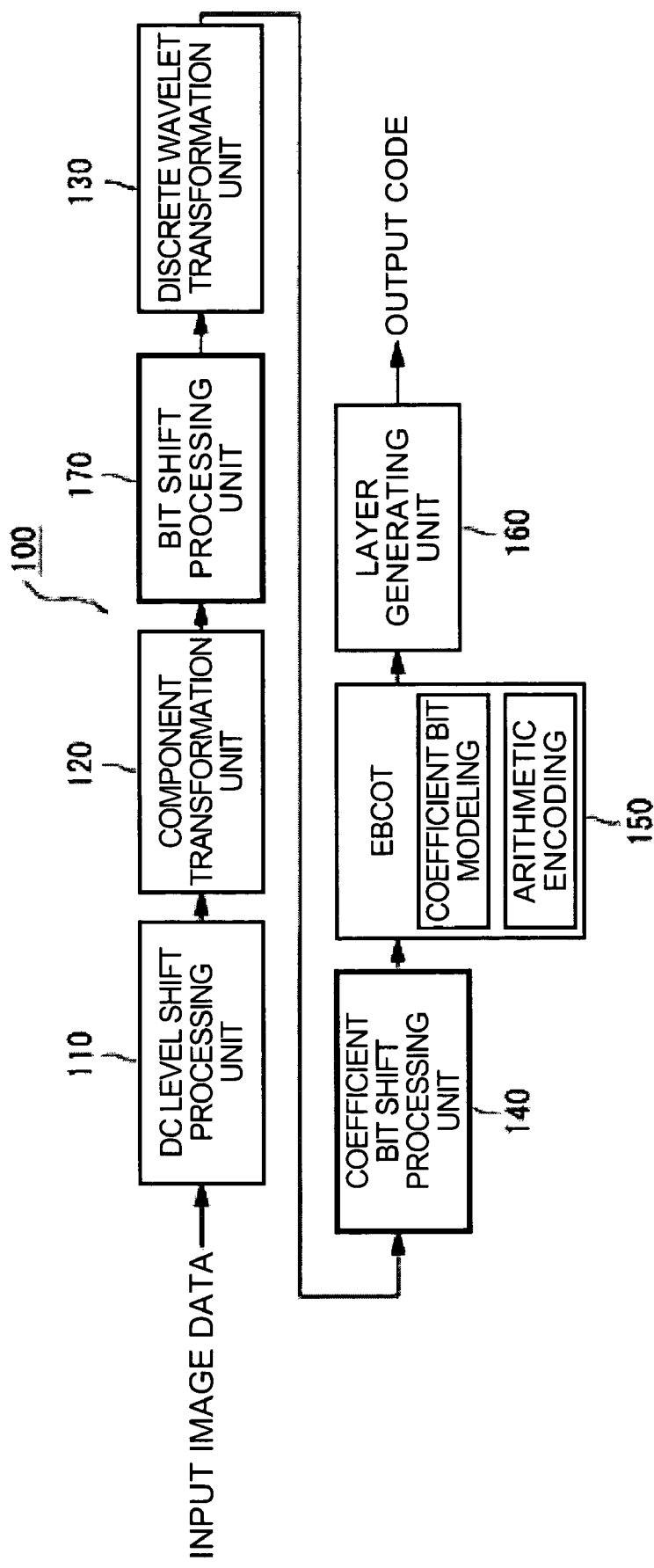
FIG. 10 is a block diagram showing a third embodiment of a digital image encoding device.

Next, FIG. 10 shows a digital image encoding device 100 according to a third embodiment of the invention. As shown in FIG. 10, the digital image encoding device 100 includes a bit shift processing unit 170 that is provided between the component transformation unit 120 and the discrete wavelet transform unit 130, like the second embodiment. The digital image encoding device 100 further includes a coefficient bit shift processing unit 140 that is provided between the discrete wavelet transform unit 130 and the EBCOT 150, like the first embodiment. Therefore, the bit shift processing can be performed for each component before the discrete wavelet transform processing, while the bit shift processing can be appropriately performed for each sub-band coefficient after the discrete wavelet transform processing.

According to this configuration, the bit shift processings can be performed for each data before and after the discrete wavelet transform processing, and thus an optimal encoding can be achieved corresponding to the kind of image or image quality. For example, in a case in which high-speed encoding is expected even when there are some damages to image quality in appearance, when the bit shift processing is performed for the component before the discrete wavelet transform processing, it is possible to provide higher-speed encoding. In addition, in a case in which a high compression ratio is desired without damaging image quality in appearance, a fine bit shift processing is performed for each sub-band coefficient after the discrete wavelet transform processing, so that encoding can be implemented in a desired quality.

In addition, in some cases, a predetermined bit shift processing may be performed before and after the discrete wavelet transform processing. Further, according to the kind of image, a high-speed processing and high-quality encoding can be achieved simultaneously.

Figure 11:
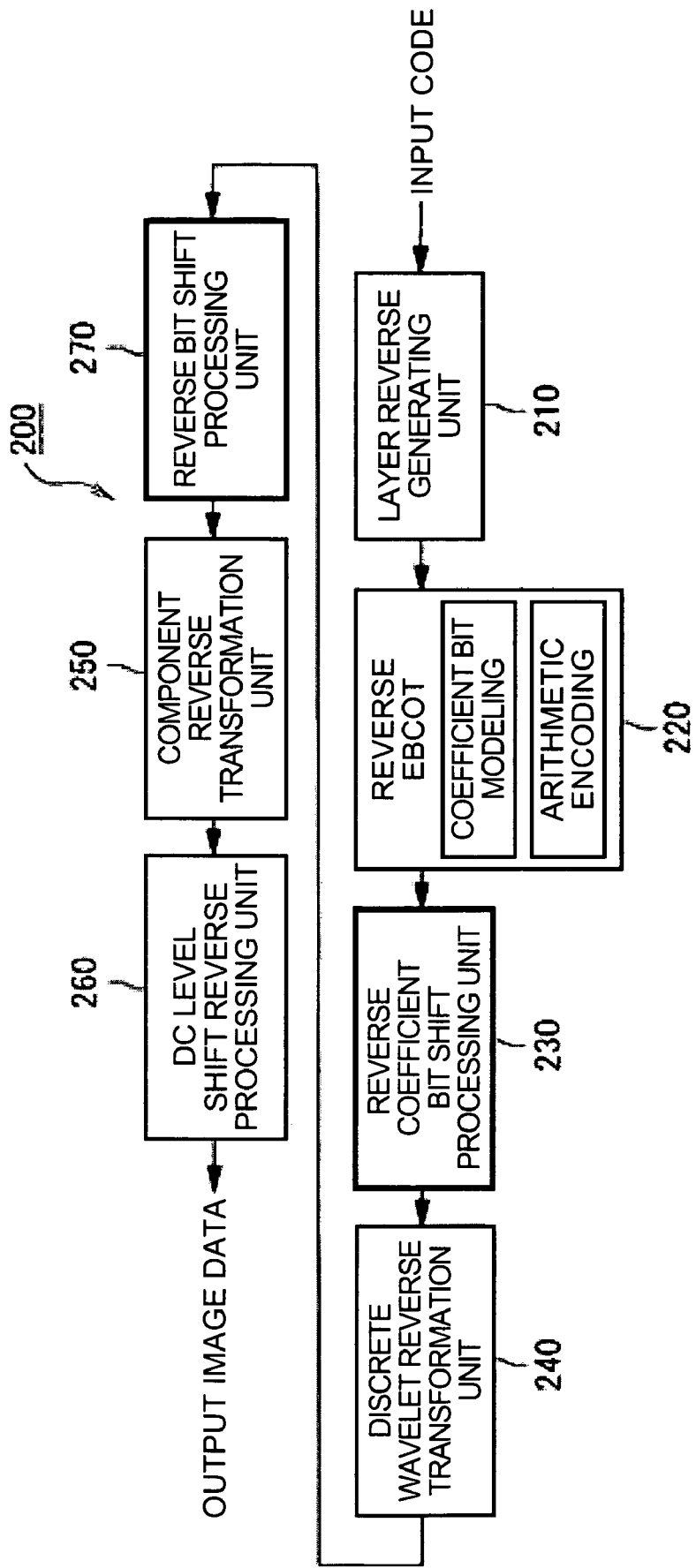
FIG. 11 is a block diagram showing a third embodiment of a digital image decoding device.

In addition, FIG. 11 shows a third embodiment of a digital image decoding device 200 which decodes data encoded by such a digital image encoding device 100. The digital image decoding device 200 includes a reverse bit shift processing unit 270 that is provided between the discrete wavelet reverse transformation unit 240 and the component reverse transformation unit 250, like the second embodiment, in addition to the above-described reverse bit shift processing unit 230 of the digital image decoding device 200 (FIG. 5) in the first embodiment.

Therefore, data encoded by the digital image encoding device 100 shown in FIG. 10 is decoded into the sub-band coefficient via the layer reverse generating unit 210, the reverse EBCOT 220. Subsequently, when the bit shift processing is performed for each sub-band coefficient according to the coefficient bit shift processing unit 140 of the digital image encoding device 100 in FIG. 11, the reverse bit shift processing is performed by the coefficient bit shift processing unit 230, and thus data is decoded into component data before the discrete wavelet transform processing.

Next, when the bit shift processing is performed for each component data by the bit shift processing unit 170 of the digital image encoding device 100 in FIG. 10, the reverse bit shift processing is performed by the reverse bit shift processing unit 270, and data is decoded into data just after the component transformation. Therefore, data is decoded into image data close to original image data through the component reverse transformation unit 250 and the DC level shift reverse processing unit 260.

According to this configuration, like the first and second embodiments, it is possible to decode image data of the amount of data the same as image data before encoding. Further, a high quality image, which is not visually perceived as or extremely close to original digital image data (original image: BMP file) can be obtained.

Figure 12:
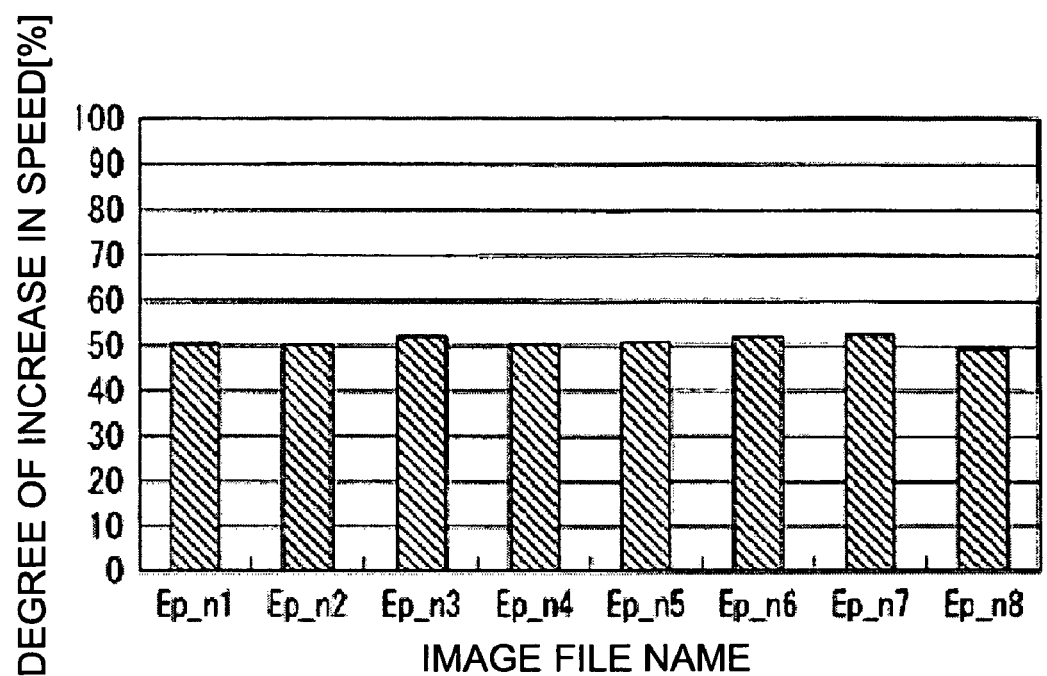
FIG. 12 is a graph showing the degree of increase in speed of a digital image encoding method of the invention with respect to an encoding processing time by standard JPEG2000.

FIG. 12 shows the degree of increase in speed of encoding processing time of eight images (image file names are Ep_n1 to Ep_n8) by the digital image encoding device 100 and the digital image encoding method using the digital image encoding device 100 according to the present embodiment.

Here, the degree of increase in speed represents how much encoding time is required in percent with respect to encoding time in standard JPEG2000, and the bit shift processing represents a method of transforming each sub-band coefficient, as shown in FIG. 3.

As a result, as apparent from FIG. 12, encoding time is markedly reduced up to about 50 percent for each image. Moreover, when the quality of an image decoded by the digital image encoding method corresponding to the invention described below is compared with the quality of an image decoded in standard JPEG2000, no difference is visually perceived between the qualities of the two images.

Figure 13:
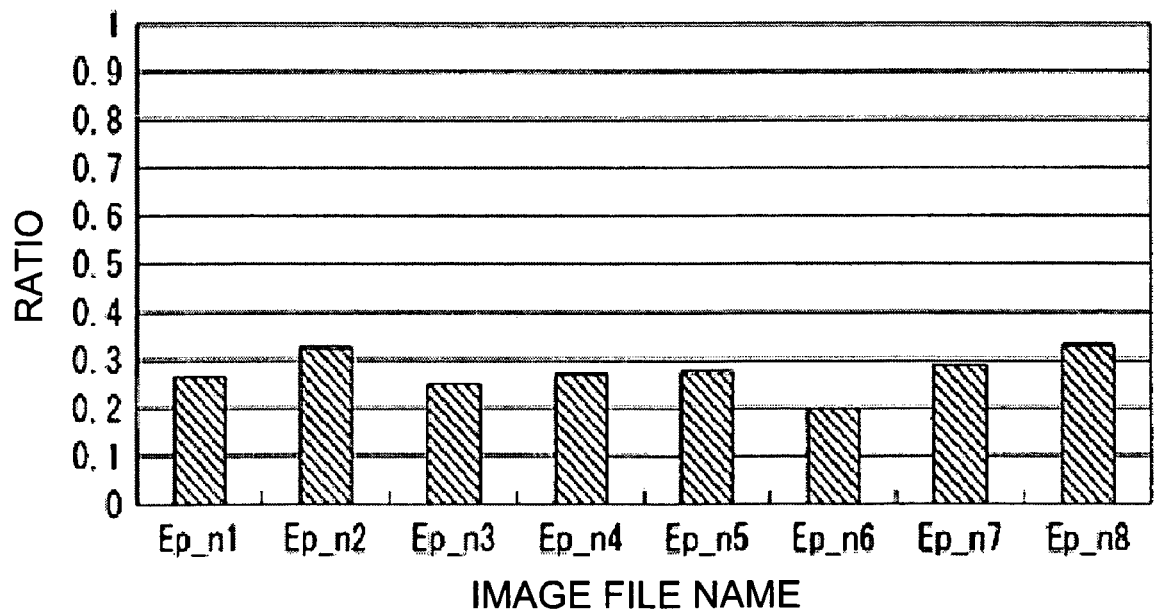
FIG. 13 is a graph showing a ratio between a file size of an encoded image according to the invention to a file size of an encoded image according to standard JPEG2000.

In addition, FIG. 13 shows a ratio between a file size of an encoded image according to the present embodiment and a file size of an encoded image according to standard JPEG2000. Here, the file size of the encoded image according to the invention has the same image quality and can be made compact up to about ⅓ to ⅕, as compared with the file size of the encoded image according to standard JPEG2000.

In addition, in the digital image encoding processing of the present embodiment, when the number of bit shift is increased, the amount of data to be processed is decreased. Therefore, it is possible to provide high-speed encoding than the above embodiment, but the image quality is degraded by that amount.

Figure 15:
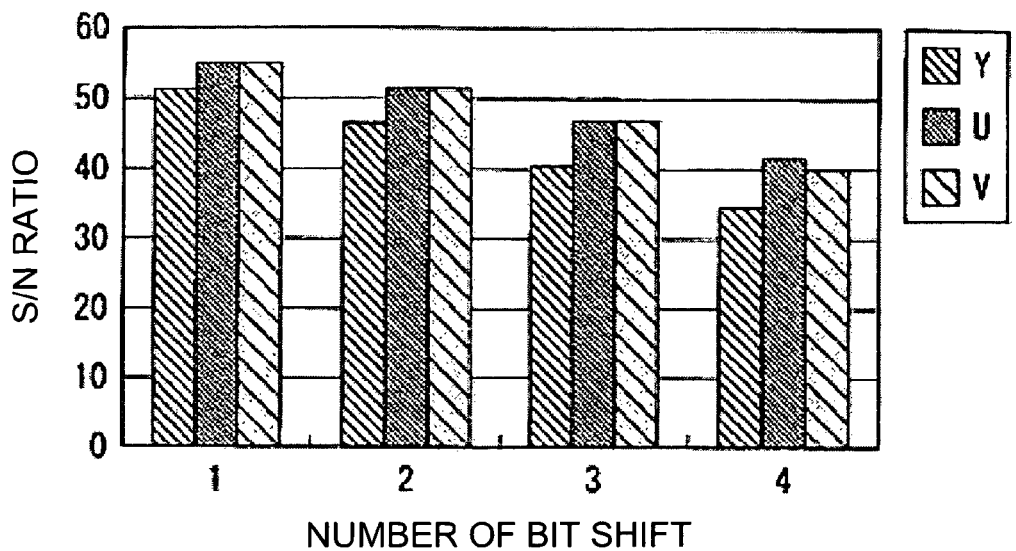
FIG. 15 is a graph showing the relationship between the number of bit shift and an S/N.

In addition, FIG. 15 shows an S/N ratio of the image in the bit shift of each Y, U, and V. The S/N ratio of the image is an index of image quality. Generally speaking, the higher the S/N ratio is, the cleaner an image is provided. As shown in FIG. 15, U and V are almost the same values and Y is markedly reduced. A descending order in the degrees of contribution to the image is as follows.

1) UV one bit, 2) UV two bits, 3) Y one bit, 4) UV three bits, 5) Y two bits, 6) UV four bits, and 7) Y three bits.

FIG. 15 shows first to fourth bit shift processings. Generally, when the S/N ratio is more than 45, it will be appreciated that there is no visual image degradation. As shown in FIG. 15, up to the third bit shift processing, the degradation of the image is rarely perceived.

In addition, it has been confirmed through the experiment that, generally, when the S/N ratio is more than 45, as described above, the image degradation cannot be visually perceived, but, according to the kind of image, the degradation of the image cannot be visually perceived even when the S/N ratio is less than 45.

Figure 16:
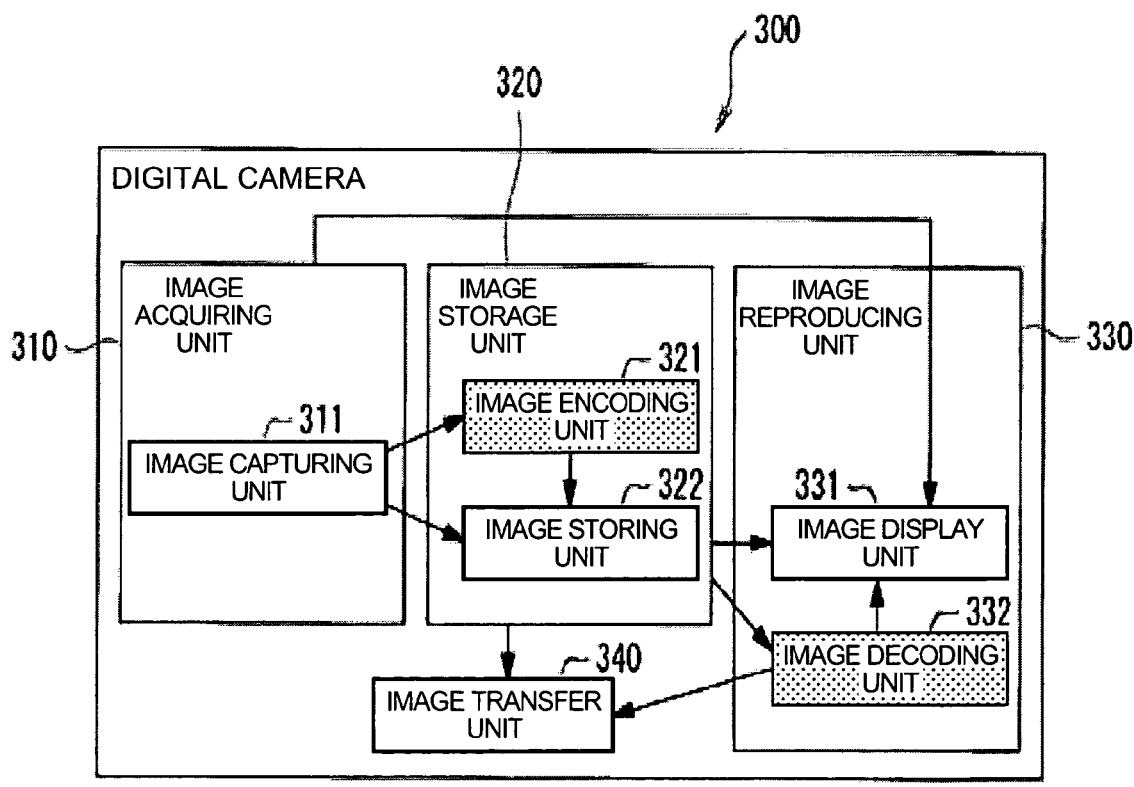
FIG. 16 is a block diagram showing an example in which a digital image encoding device and a digital image decoding device according to the invention are applied to an actual information apparatus.
Figure 17:
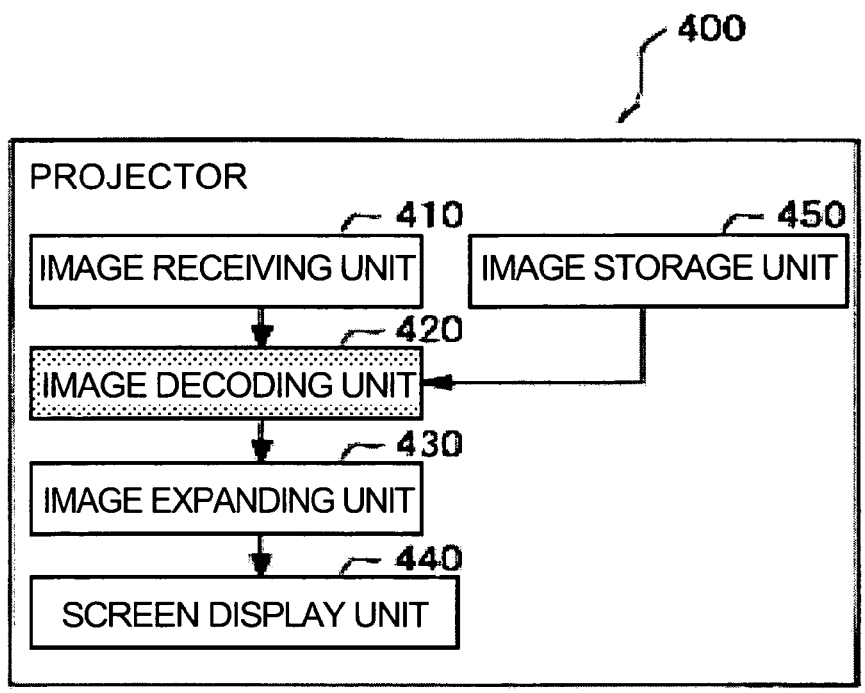
FIG. 17 is a block diagram showing another example in which a digital image encoding device and a digital image decoding device according to the invention are applied to an actual information apparatus.
Figure 18:
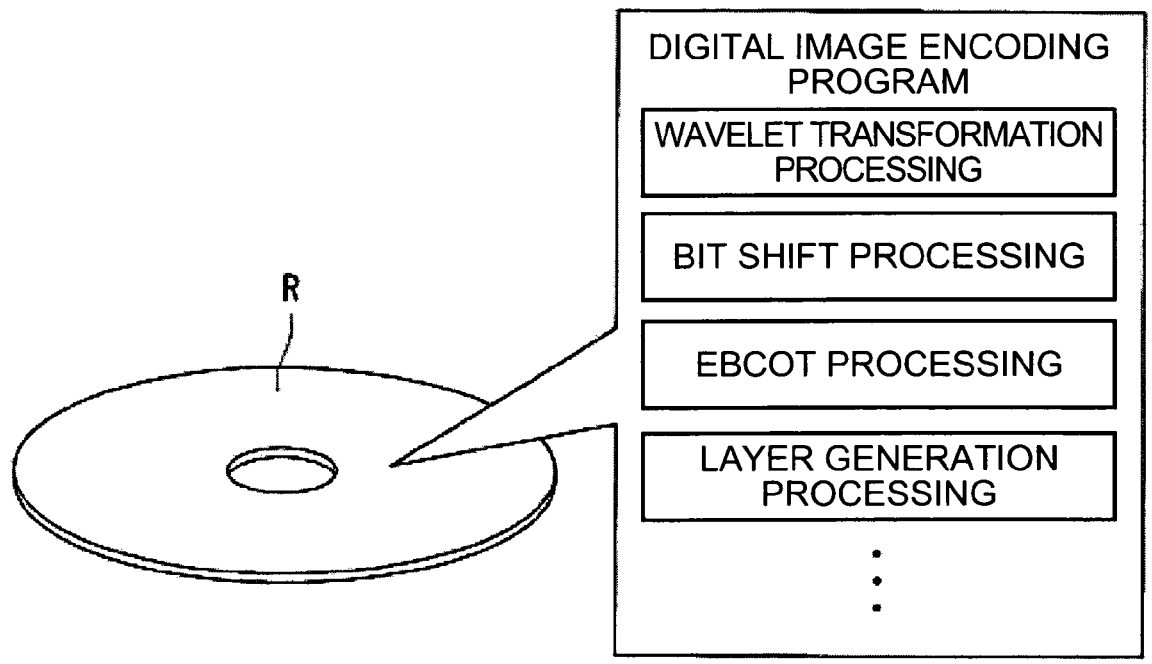
FIG. 18 is a diagram conceptually showing an example of a computer readable recording medium having a program recorded thereon according to the invention.

FIGS. 16 and 17 show examples in which a digital image encoding device 100 and a digital image decoding device 200 according to the invention described above are applied to an actual information apparatus.

First, FIG. 16 shows the basic configuration of a related art digital camera 300, which sweeps over a current camera market, as an example of the information apparatus 1.

Specifically, the related art digital camera 300 broadly includes an image acquiring unit 310 that acquires an image, an image storage unit 320 that stores the acquired image, an image reproducing unit 330 that reproduces the acquired image, and an image transmitting unit 340 that transmits the acquired image to other recording mediums through an USB or the like. In addition, the image acquiring unit 310 includes an image capturing unit 311 that has an image-capturing device, such as a CCD or the like. The image storage unit 320 includes an image encoding unit 321 and an image storing unit 322. Further, the image reproducing unit 330 includes an image display unit 331 and an image decoding unit 332.

In addition, in the related art digital camera 300 constituted in such a manner, it is possible to use the digital image encoding device 100 of the invention as the image encoding unit 321 of the image storage unit 320, and the digital image decoding device 200 of the invention as the image decoding unit 322 of the image reproducing unit 330, respectively.

Next, FIG. 17 shows the basic configuration of a projector 400 which is a display device for performing display in a magnified scale to implement a home theater or the like, as another example of the information apparatus.

Specifically, the related art projector 400 broadly includes an image receiving unit 410 that receives image data to display, an image decoding unit 420 that decodes the received image data or image data stored in advance in the image storage unit 450, an image expanding unit 430 that expands the image decoded by the image decoding unit 420, and a screen display unit 440 that displays the image expanded by the image expanding unit 430.

In addition, in the related art projector 400 constituted in such a manner, it is possible to use the digital image decoding device 200 of the invention as it is as the image decoding unit 420 for decoding the compressed image data compressed in a JPEG2000 scheme.

The digital image encoding device 100 and the digital image decoding device 200 according to the invention can be applied as the image encoding unit and the image decoding unit of the related art information apparatus, as it is. Therefore, it is possible to provide an information processing apparatus, in which a high-speed encoding processing is achieved and the amount of memory used is markedly reduced, as compared with the related art.

In addition, each unit of the digital image encoding device 100 and the digital image decoding device 200 of the invention can be implemented in software using a computer system incorporated into the digital camera 300 or the projector 400, a personal computer, or the like. Therefore, the computer program may be incorporated into a product while being stored in the semiconductor ROM in advance, or distributed via a network, such as the Internet or the like. Alternatively, the computer program can be easily provided to a desired user through a computer readable recording medium R, such as the CD-ROM, the DVD-ROM, and the FD.

This application claims priority to Japanese Patent Application Nos. 2004-235227 filed Aug. 12, 2004 and 2005-188389 filed Jun. 28, 2005 which are hereby expressly incorporated by reference herein in their entirety.

What is claimed is:

1. A digital image encoding device which encodes digital image data using a discrete wavelet transform, the digital image encoding device comprising:
 a coefficient bit shift processing unit that performs bit shift processing on a wavelet coefficient after the discrete wavelet transform,
 wherein the coefficient bit shift processing shifts the wavelet coefficient to a lower bit side by a predetermined number of bits to truncate the predetermined number of bits on the lower bit side of the wavelet coefficient, replaces the predetermined number of bits on an upper bit side of the wavelet coefficient with zeros, and reduces a number of effective bits to create a new wavelet coefficient and wherein the coefficient bit shift processing unit calculates degrees of contribution of image quality for each sub-band coefficient constituting the wavelet coefficient, and performs different bit shift processing for each sub-band coefficient according to the degrees of contribution by using a bit shift of one bit for a sub-band of a luminance component of the digital image data and a bit shift of more than three bits for a color difference component of the digital image data.

2. The digital image encoding device according to claim 1, wherein the coefficient bit shift processing unit performs the bit shift processing on sub-band coefficients including a high frequency component among sub-band coefficients constituting the wavelet coefficient.

3. The digital image encoding device according to claim 1, further comprising:
 a component transformation unit that transforms the digital image data into a color space depending on human visual characteristics before the discrete wavelet transform.

4. The digital image encoding device according to claim 3, wherein the component transformation unit performs color transformation processing that transforms the digital image data into the luminance component and the color difference component.

5. A digital image decoding device which decodes encoded data encoded by the digital image encoding device according to claim 1 into digital image data close to original digital image data using a discrete wavelet reverse transformation, the digital image decoding device comprising:
 a reverse coefficient bit shift processing unit that performs reverse bit shift processing on a wavelet coefficient before the discrete wavelet reverse transformation,
 wherein the reverse bit shift processing shifts the wavelet coefficient to an upper bit side by a predetermined number of bits, and increases a number of effective bits to create a wavelet coefficient different from the wavelet coefficient.

6. The digital image decoding device according to claim 5, wherein, when a bit shift processing at the time of encoding is performed only on some sub-band coefficients among sub-band coefficients constituting the wavelet coefficient, the reverse coefficient bit shift processing unit performs the reverse bit shift processing only on the sub-band coefficients, on which the bit shift processing is performed.

7. The digital image decoding device according to claim 5, wherein, when different bit shift processings are performed for respective sub-band coefficients constituting the wavelet coefficient, the reverse coefficient bit shift processing unit performs the reverse bit shift processing corresponding to the respective bit shift processings.

8. The digital image decoding device according to claim 5, further comprising:
a component reverse transformation unit that transforms the digital image data from a color space depending on human visual characteristics to an image signal independent of the human visual characteristics, after the discrete wavelet reverse transformation.

9. The digital image decoding device according to claim 8, wherein the component reverse transformation unit performs color transformation processing that transforms the digital image data from the luminance component and the color difference component to the image signal.

10. A digital image encoding device comprising:
a discrete wavelet transform unit that divides digital image data into a high frequency component and a low frequency component to transform image data for each sub-band into a discrete wavelet coefficient;
a coefficient bit shift processing unit that performs bit shift processing on the wavelet coefficient after being transformed by the discrete wavelet transform unit;
an embedded block coding with optimal truncation unit that performs coefficient modeling processing and arithmetic encoding processing on the wavelet coefficient bit-shifted by the coefficient bit shift processing unit to generate compressed data; and
a layer generating unit that performs layering on the compressed data generated by the embedded block coding with optimal truncation unit,
wherein the coefficient bit shift processing unit shifts the wavelet coefficient to a lower bit side by a predetermined number of bits to truncate the predetermined number of bits on the lower bit side of the wavelet coefficient, replaces the predetermined number of bits on an upper bit side of the wavelet coefficient with zeros, and reduces a number of effective bits to create a wavelet coefficient different from the wavelet coefficient and wherein the coefficient bit shift processing unit calculates degrees of contribution of image quality for each sub-band coefficient constituting the wavelet coefficient, and performs different bit shift processing for each sub-band coefficient according to the degrees of contribution by using a bit shift of one bit for a sub-band of a luminance component of the digital image data and a bit shift of more than three bits for a color difference component of the digital image data.

11. A digital image encoding device comprising:
a bit shift processing unit that bit-shifts digital image data;
a discrete wavelet transform unit that divides digital image data bit-shifted by the bit shift processing unit into a high frequency component and a low frequency component to transform image data for each sub-band into a discrete wavelet coefficient;
an embedded block coding with optimal truncation unit that performs coefficient modeling processing and arithmetic encoding processing for the wavelet coefficient transformed by the discrete wavelet transform unit to generate compressed data; and
a layer generating unit that performs layering on the compressed data generated by the embedded block coding with optimal truncation unit,
wherein the bit shift processing unit shifts the digital image data to a lower bit side by a predetermined number of bits to truncate the predetermined number of bits on the lower bit side of the wavelet coefficient, replaces the predetermined number of bits on an upper bit side of the wavelet coefficient with zeros, and reduces a number of effective bits to create new digital image data different from the digital image data and wherein the coefficient bit shift processing unit calculates degrees of contribution of image quality for each sub-band coefficient constituting the wavelet coefficient, and performs different bit shift processing for each sub-band coefficient according to the degrees of contribution by using a bit shift of one bit for a sub-band of a luminance component of the digital image data and a bit shift of more than three bits for a color difference component of the digital image data.

* * * * *